US012018968B2

(12) United States Patent
Paul

(10) Patent No.: US 12,018,968 B2
(45) Date of Patent: Jun. 25, 2024

(54) VOLUMETRIC MEASUREMENT FOR NUTRITIONAL CONTENT

(71) Applicant: Macro Diabetic, LLC, Sacramento, CA (US)

(72) Inventor: Robert Paul, Sacramento, CA (US)

(73) Assignee: Macro Diabetic, LLC, Sacramento, CA (US)

(*) Notice: Subject to any disclaimer, the term of this patent is extended or adjusted under 35 U.S.C. 154(b) by 0 days.

(21) Appl. No.: 18/500,082

(22) Filed: Nov. 1, 2023

(65) Prior Publication Data

US 2024/0151570 A1 May 9, 2024

Related U.S. Application Data

(60) Provisional application No. 63/422,957, filed on Nov. 5, 2022.

(51) Int. Cl.
*G01F 19/00* (2006.01)
*G09B 19/00* (2006.01)

(52) U.S. Cl.
CPC ....... *G01F 19/007* (2013.01); *G09B 19/0092* (2013.01)

(58) Field of Classification Search
CPC ...... G01F 19/007; G01F 19/00; G01F 19/002; G01F 19/005; G01F 22/00; G09B 19/0092
USPC ........... 99/342; 426/231; 222/23, 25, 26, 71, 222/154; 73/426–429, 149
See application file for complete search history.

(56) References Cited

U.S. PATENT DOCUMENTS 3,457,085 A * 7/1969 Joseph ................. A23B 4/0056
426/414
2012/0077154 A1 3/2012 Highet
2020/0095052 A1* 3/2020 Singer ................. B65D 1/0223

FOREIGN PATENT DOCUMENTS

JP 2010131343 A 6/2010
JP 2012249773 A 12/2012
KR 200249892 Y1 11/2001
KR 100962269 B1 6/2010
WO WO-2016115587 A1 * 7/2016 ............. A23L 27/70

* cited by examiner

*Primary Examiner* — Robert R Raevis
(74) *Attorney, Agent, or Firm* — Gallium Law; Wesley Schwie; Isabel Fox

(57) ABSTRACT

The present disclosure describes a device including a wall protruding from and surrounding a base portion and an open top portion located opposite the base portion. The device may define a volume corresponding to a predetermined macronutrient quantity for a food type. Also described is a kit including a first bowl and a second bowl. In some examples, the first and second bowls each include a wall protruding from and surrounding a base portion and defining an open top portion located opposite the base portion. According to some examples, the first bowl defines a first volume corresponding to a predetermined macronutrient quantity of a first food type and the second bowl defines a second volume corresponding to a predetermined macronutrient quantity of a second food type that is different from the first volume corresponding to the predetermined macronutrient quantity of the first food type.

20 Claims, 33 Drawing Sheets

VOLUMETRIC MEASUREMENT FOR NUTRITIONAL CONTENT

CROSS-REFERENCE TO RELATED APPLICATIONS

The present application claims priority to U.S. Provisional Patent Application No. 63/422,957 filed on Nov. 5, 2022, entitled "Volumetric measurement of carbohydrate content of foods," the entire disclosure of which is incorporated by reference herein.

BACKGROUND OF THE INVENTION

The World Health Organization (WHO) estimates that more than 1.9 billion adults are overweight. Common health consequences of being overweight include diabetes, amongst others. One of the primary strategies to manage diabetes and reduce weight is to monitor food consumption by portioning and measuring meal and snack sizes. In the case of diabetics, this predominantly also includes tracking carbohydrate intake.

However, much effort must be expended to properly track, measure, and portion food intake. These tasks often require the use of many devices (e.g., food scale, calculator, and food tracking journal or mobile application) to regulate intake for a single snack or meal properly. Proper monitoring also frequently requires algebraic calculations, which many people worldwide do not know how to do. These issues are compounded if an individual needs to track or find the optimum amounts of multiple macronutrients, such as protein, carbohydrates, fats. Accordingly, there exists a great need for a user-friendly way to monitor food intake and portion sizes.

SUMMARY OF THE INVENTION

The present disclosure describes a device including a base portion and a wall protruding from the base portion. The wall may surround the base portion. According to some examples, an open top portion is located opposite the base portion. In some examples, the device defines a volume corresponding to a predetermined macronutrient quantity for a food type. The predetermined macronutrient quantity may comprise a predetermined volume of the food type corresponding to 15 grams of carbohydrates.

According to some examples, a first indication of the food type is located on the base portion. In some examples, the first indication of the food type comprises an indication selected from the group consisting of a visual representation of the food type, a word identifying the food type, and combinations thereof. A second indication of the food type may be located on an upper rim of the wall adjacent the open top portion. According to some examples, the second indication of the food type comprises a color.

Also described in the present disclosure is a kit including a first bowl and a second bowl. In some examples, the first bowl includes a base portion. According to some examples, the first bowl also includes a wall protruding from and surrounding the base portion of the first bowl. In some examples, the wall of the first bowl is configured to define an open top portion. The open top portion may be located opposite the base portion. According to some examples, the first bowl defines a first volume corresponding to a predetermined macronutrient quantity of a first food type.

In some examples, the second bowl of the kit includes a base portion. According to some examples, the second bowl includes a wall protruding from the base portion. The wall may surround the base portion of the second bowl. In some examples, the wall of the second bowl is configured to define an open top portion. According to some examples, the open top portion is located opposite the base portion. The second bowl may define a second volume corresponding to a predetermined macronutrient quantity of a second food type. In some examples, the first volume corresponding to the predetermined macronutrient quantity of the first food type is different from the second volume corresponding to the predetermined macronutrient quantity of the second food type.

In some examples, the predetermined macronutrient quantity of the first food type comprises a predetermined volume of the first food type. According to some examples, the predetermined volume of the first food type corresponds to 15 grams of carbohydrates. The predetermined macronutrient quantity of the second food type may comprise a predetermined volume of the second food type. In some examples, the predetermined volume of the second food type corresponds to 15 grams of carbohydrates.

According to some examples, an indication of the first food type is located on the base portion of the first bowl. An indication of the second food type may be located on the base portion of the second bowl. In some examples, the indication of the first food type comprises an indication selected from the group consisting of a visual representation of the first food type, a word identifying the first food type, and combinations thereof. According to some examples, the indication of the second food type comprises an indication selected from the group consisting of a visual representation of the second food type, a word identifying the second food type, and combinations thereof. A second indication of the first food type may be located on an upper rim of the wall of the first bowl. In some examples, a second indication of the second food type is located on an upper rim of the wall of the second bowl. According to some examples, the second indication of the first food type comprises a first color. The second indication of the second food type may comprise a second color. In some examples, the second bowl is sized and configured to nestably couple to an interior portion of the first bowl.

According to some examples, the kit includes a third bowl. The third bowl may include a base portion and a wall protruding from and surrounding the base portion of the third bowl. In some examples, the wall of the third bowl is configured to define an open top portion located opposite the base portion. According to some examples, the third bowl defines a third volume. The third volume may correspond to a predetermined macronutrient quantity of carbohydrates of a third food type. In some examples, an indication of the third food type is located on the base portion of the third bowl. According to some examples, the indication of the third food type comprises an indication selected from the group consisting of a visual representation of the third food type, a word identifying the third food type, and combinations thereof. A second indication of the third food type may be located on an upper rim of the wall of the third bowl. In some examples, the second indication of the third food type comprises a third color. According to some examples, the third bowl is sized and configured to nestably couple to an interior portion of the second bowl.

The kit may include a fourth bowl. In some examples, the fourth bowl includes a base portion and a wall protruding from and surrounding the base portion of the fourth bowl. According to some examples, the wall of the fourth bowl is configured to define an open top portion located opposite the base portion. The fourth bowl may define a fourth volume. In some examples, the fourth volume corresponds to a predetermined macronutrient quantity of carbohydrates for a fourth food type. According to some examples, an indication of the fourth food type is located on the base portion of the fourth bowl. The indication of the fourth food type may comprise an indication selected from the group consisting of a visual representation of the fourth food type, a word identifying the fourth food type, and combinations thereof. In some examples, a second indication of the fourth food type is located on an upper rim of the wall of the fourth bowl. According to some examples, the second indication of the fourth food type comprises a fourth color. The fourth bowl may be sized and configured to nestably couple to an interior portion of the third bowl.

In some examples, the kit includes a fifth bowl. According to some examples, the fifth bowl includes a base portion and a wall protruding from and surrounding the base portion of the fifth bowl. The wall of the fifth bowl may be configured to define an open top portion located opposite the base portion. In some examples, the fifth bowl defines a fifth volume. According to some examples, the fifth volume corresponds to a predetermined macronutrient quantity of carbohydrates for a fifth food type. An indication of the fifth food type may be located on the base portion of the fifth bowl. In some examples, the indication of the fifth food type comprises an indication selected from the group consisting of a visual representation of the fifth food type, a word identifying the fifth food type, and combinations thereof. According to some examples, a second indication of the fifth food type is located on an upper rim of the wall of the fifth bowl. The second indication of the fifth food type may comprise a fifth color. In some examples, the fifth bowl is sized and configured to nestably couple to an interior portion of the fourth bowl.

The foregoing, and other features and advantages of the invention, will be apparent from the following, more particular description of the preferred examples of the invention, the accompanying drawings, and the claims.

BRIEF DESCRIPTION OF DRAWINGS

These and other features, aspects, and advantages are described below with reference to the drawings, which are intended to illustrate, but not to limit, the invention. In the drawings, like characters denote corresponding features consistently throughout similar examples.

COMPONENT INDEX

Figure 1:
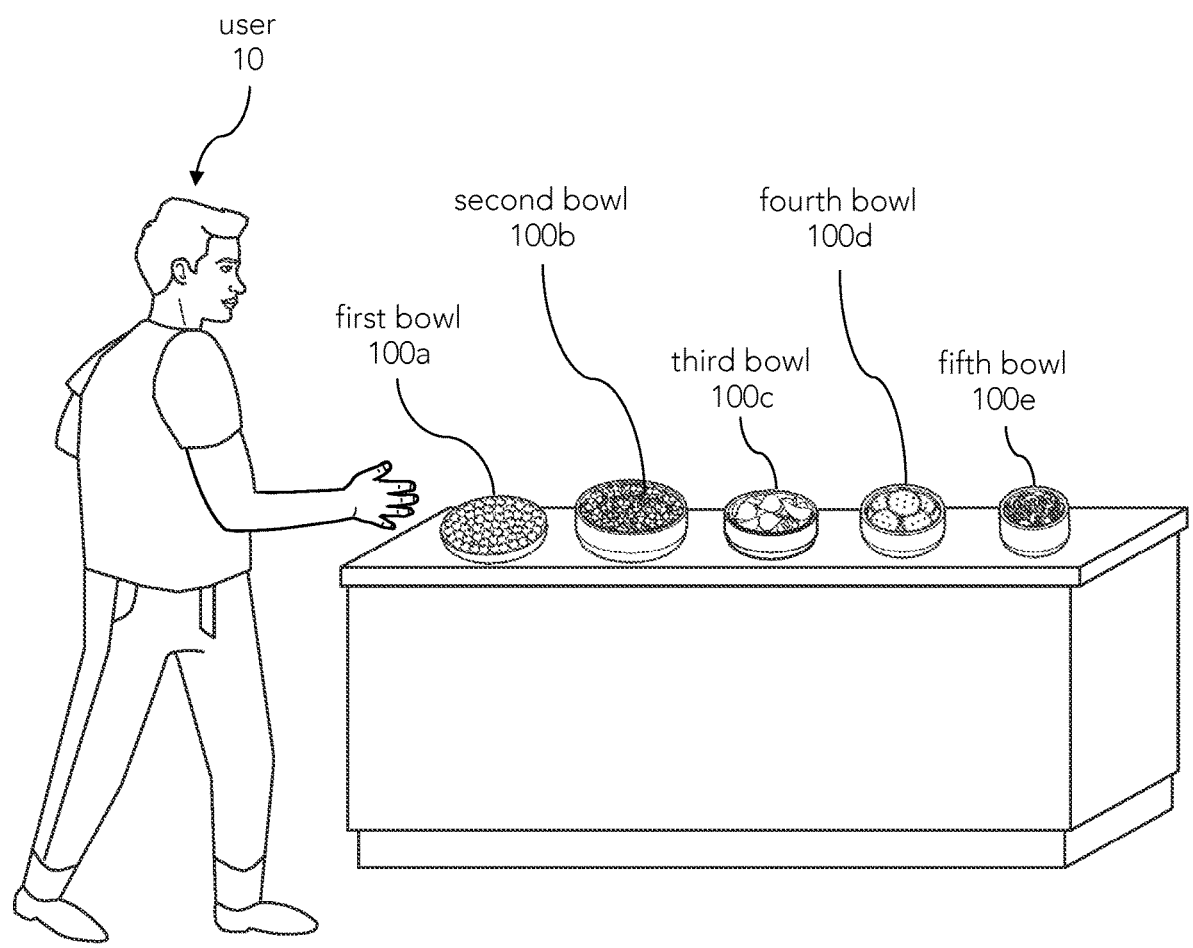
FIG. 1 illustrates several bowls for food portioning in use, according to some examples.

10—User
20—Kit
30—Device
40—Measuring device
100—Bowl
100a—First bowl
100b—Second bowl
100c—Third bowl
100d—Fourth bowl
100e—Fifth bowl
200—Food type
200a—First food type
200b—Second food type
200c—Third food type
200d—Fourth food type
200e—Fifth food type
300—First color 302—Second color
304—Third color
306—Fourth color
308—Fifth color
400—Interior portion
400a—First interior portion
400b—Second interior portion
400c—Third interior portion
400d—Fourth interior portion
400e—Fifth interior portion
402—Interior base portion
402a—First interior base portion
402b—Second interior base portion
402c—Third interior base portion
402d—Fourth interior base portion
402e—Fifth interior base portion
404—Exterior base portion
404a—First exterior base portion
404b—Second exterior base portion
404c—Third exterior base portion
404d—Fourth exterior base portion
404e—Fifth exterior base portion
500—Wall
500a—First wall
500b—Second wall
500c—Third wall
500d—Fourth wall
500e—Fifth wall
502—Top portion
502a—First top portion
502b—Second top portion
502c—Third top portion
502d—Fourth top portion
502e—Fifth top portion
504—Upper rim
504a—First upper rim
504b—Second upper rim
504c—Third upper rim
504d—Fourth upper rim
504e—Fifth upper rim
600—First indication
600a—First indication of the first bowl
600b—First indication of the second bowl
600c—First indication of the third bowl
600d—First indication of the fourth bowl
600e—First indication of the fifth bowl
602—Second indication
602a—Second indication of the first bowl
602b—Second indication of the second bowl
602c—Second indication of the third bowl
602d—Second indication of the fourth bowl
602e—Second indication of the fifth bowl
604—Third indication
604a—Third indication of the first bowl
604b—Third indication of the second bowl
604c—Third indication of the third bowl
604d—Third indication of the fourth bowl
604e—Third indication of the fifth bowl
700—Interior portion of measuring device
702—Top portion of measuring device
704—Upper rim of measuring device
800—Wall of measuring device
802—Handle of measuring device
804—Base portion of measuring device

DETAILED DESCRIPTION OF THE INVENTION

The prevalence of obesity and similar weight problems remains one of the largest health issues throughout the world. According to the World Health Organization, 1.9 billion people worldwide are overweight, with 650 million adults, 340 million adolescents, and 39 million children classified as obese. That corresponds to 39% of the world population being overweight and 13% classified as obese. It is also well known in the field that a higher body mass index (BMI), currently the primary way a person is classified as overweight or obese, directly correlates to a higher likelihood of numerous medical issues, such as heart disease, kidney issues, and diabetes. Among these, diabetes is one of the more common issues associated with overweight and obese individuals, with 422 million diabetics worldwide in 2014, according to WHO. Unfortunately for these people, the most common ways to manage diabetes often include the use of insulin and medications, both of which can be expensive.

One of the primary methods to manage diabetes, reduce body weight, and build muscle mass, in addition to other health-related issues, is portioning and measuring food consumption. The prevalence of untreated health issues is staggering, as are the physical and financial consequences. However, portioning and measuring food consumption is by no means an easy task, although it is a primary strategy in managing health issues and can sometimes make the most significant difference.

One of the most effective ways to manage diabetes is to maintain a strict regimen of portioning and measuring food and, more specifically, carbohydrate consumption. However, it is also one of the most difficult. According to the International Diabetes Federation, 6.7 million people died due to diabetes-related issues in 2021 alone, with unmanaged diabetes causing 966 billion dollars in health expenditures the same year. Additionally, the CDC has stated that diabetics accounted for 12.8% of all emergency department visits in the United States, with an additional 27 million visits to physician offices for diabetes. Despite the significant physical and financial cost of diabetes, as well as many other health issues, there has not been a simple, effective system to help manage and monitor food consumption.

Even with all of this information, monitoring food consumption remains no small feat. To properly measure macronutrients, such as fats, protein, and carbohydrates, an individual must use a number of devices. Where a seemingly simple measurement of calories in a bowl of chips usually requires the ability to count the chips and use the calorie information on the bag, a person with diabetes attempting to find the amount of carbohydrates in the same bowl of chips might require a scale to measure the weight of the chips, an understanding of the carbohydrate density of the chips, and a calculator to calculate the amount of carbohydrates, as well as an understanding of the proper amount of carbohydrates they need or should not surpass based on their current blood glucose levels. While some foods have some nutritional facts listed on the packaging, many foods do not, such as produce or foods bought from other countries that do not require listing that information. All of this is compounded if the person attempting to manage their macronutrient intake does not have the ability to carry out the requisite algebraic calculations or if they need to track more than one macronutrient at a time and find the optimal amount of one macronutrient without intaking too much of another.

As an example of this difficulty, one can look at the amount of effort and skill required to measure 45 grams of carbohydrates of cooked russet potato accurately. This would require buying a food scale, searching the Internet for accurate nutritional information on russet potatoes, finding that 148 grams of russet potatoes equals 26 grams of carbohydrates, then using algebraic equations to find that 45 (target grams of carbohydrates) divided by 26 (carbohydrate amount on the nutrition label) equals 1.73. The user would then have to multiply that number by the base weight on the nutrition label (148 grams of potatoes), which finally equals 256 grams, which is the weight of russet potatoes needed for 45 grams of carbohydrates. Then one would also need to cut the potato into small enough pieces to be weighed accurately and place the pieces of potato onto the scale until the exact weight of potatoes (256 grams) which equals 45 grams of carbohydrates, is measured. Beyond all of this, the potatoes still need to be cooked. Additionally, any excess potatoes cut are now wasted as the person measuring would likely not want to intake more than the amount they were specifically measuring for.

FIG. 1 illustrates a view of a series of bowls, in this example, depicted as a group of five bowls, as they may appear in use. In FIG. 1, a user 10 is shown reaching toward a first bowl 100a sitting on a counter containing berries. FIG. 1 also illustrates that the bowls may contain other types of food items (e.g., popcorn, chips, crackers, nuts, and the like). Additionally, FIG. 1 shows the bowls to be generally round. However, it is understood that this shape is not a requirement and is only one possible example of the shape of the bowls, serving dishes, serving utensils, measuring cups, and the like. Other possible shapes include square, rectangular, oblong, and/or "novelty" shapes (i.e., star, holiday tree, pumpkin, heart, and the like). In addition, the bowls may be configured to contain food types other than those shown in the figures and discussed in this disclosure.

In some examples, the bowls in FIG. 1 are each filled with volumes of certain foods that correspond to a specific macronutrient quantity. In one example, as illustrated in FIG. 1, a berry bowl, represented by the first bowl 100a, is filled with a single layer of blueberries along the bottom of the bowl, the volume of which corresponds to about 15 grams of carbohydrates. This quantity of carbohydrates may be based upon a recommended amount for a snack for a user with diabetes, represented in FIG. 1 as user 10, as suggested by their physician, or as preferred by the user 10.

In some examples, the bowls are filled to the top edge with different food items (e.g., popcorn is filled to the top of a popcorn bowl, chips are filled to the top of a chip bowl, crackers are filled to the top of a cracker bowl, nuts are filled to the top of a nut bowl, and so on). In FIG. 1, a popcorn bowl, a chip bowl, a cracker bowl, and a nut bowl are represented by a second bowl 100b, a third bowl 100c, a fourth bowl 100d, and a fifth bowl 100e, respectively. However, as previously mentioned, the shape and style of each bowl are not a requirement and may include different features (e.g., a lid, a bowl shape with no discernable edge, and the like). Each of the volumes of different food types may contain substantially the same quantity of a particular macronutrient. For example, in some embodiments, each bowl of the series shown in FIG. 1 is sized to accommodate 15 grams of carbohydrates of the relevant food type for each bowl.

Figure 2:
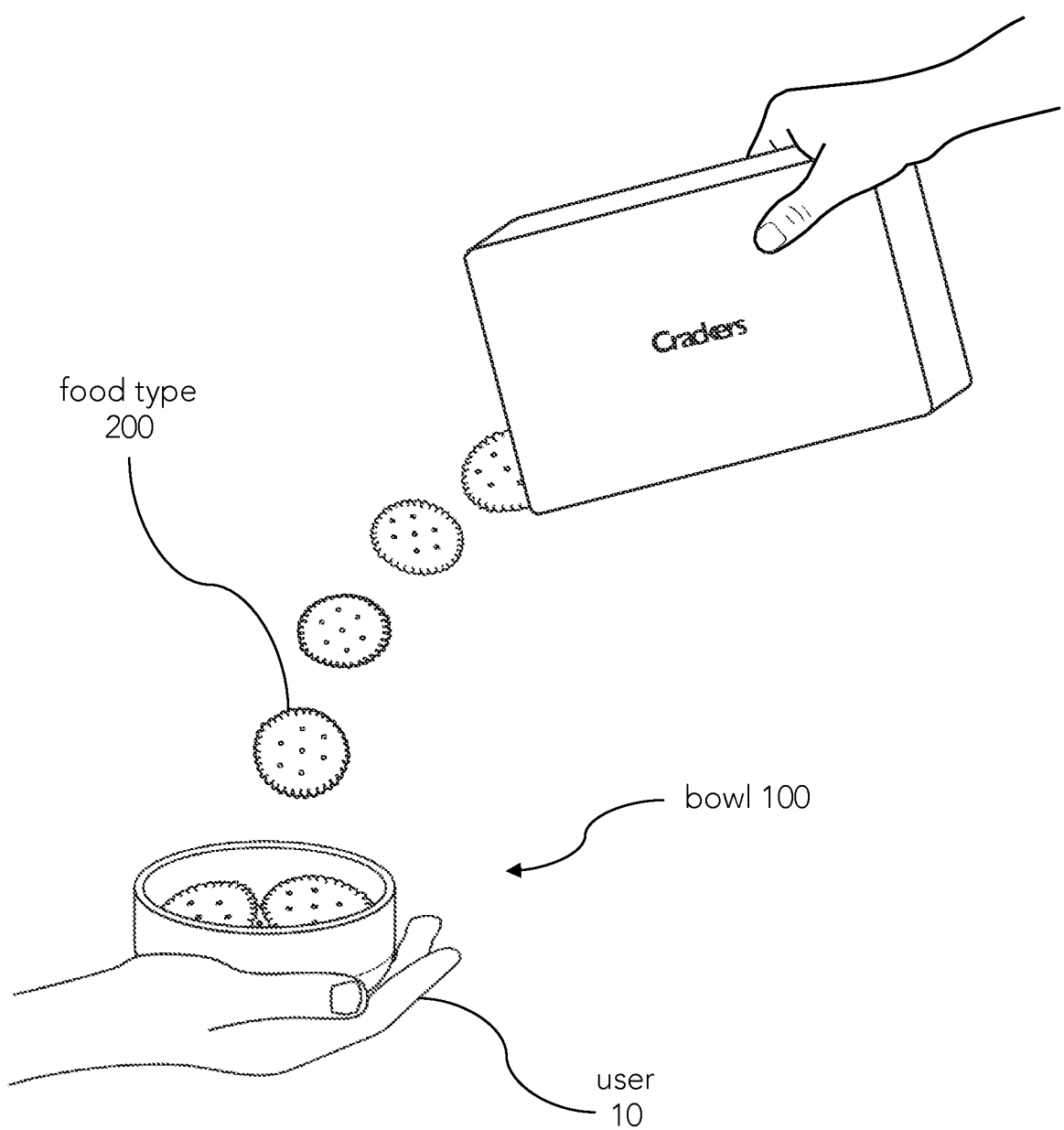
FIG. 2 illustrates a bowl being filled, according to some examples.

FIG. 2 illustrates a view of a bowl 100 being held and filled by the user 10, according to some examples. As seen in FIG. 1, the bowl 100 may have an open top so items in the bowl 100 may be added or removed easily. However, it should be understood that the top of the bowl 100 being open is not a requirement of the bowl 100 and is only one possible example.

FIG. 2 additionally depicts a food type 200 being added to the bowl 100. The food type is shown in FIG. 2 as crackers, although it should be understood that crackers are not the only possible item for the food type 200. FIG. 2 further illustrates the bowl 100 to be partially filled, with additional crackers being poured into the bowl. As discussed with reference to FIG. 1, in some examples, the bowl 100 is configured to be filled to the top edge with the food type 200. Filling the bowl 100 to the predetermined level may correspond to a specific macronutrient quantity for that volume of the food type 200. However, it is understood that the optimal fill level may vary depending on the user 10 and their goals.

Figure 3:
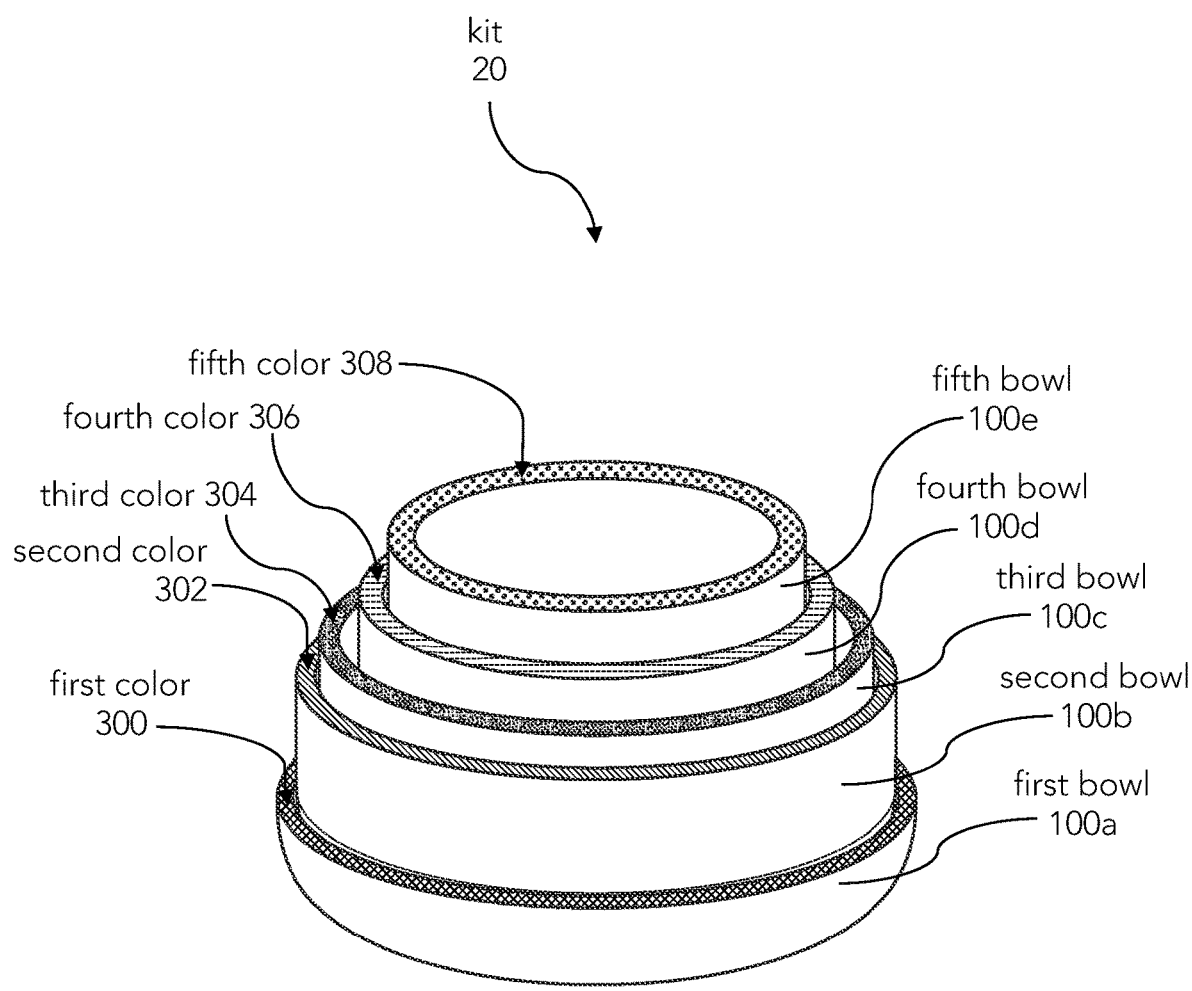
FIG. 3 illustrates a perspective view of a kit of bowls nested together, according to some examples.

FIG. 3 illustrates a perspective view of a kit 20 with the series of bowls nested together, whereby the bowls do not contain any food, according to some examples. This figure shows the fifth bowl 100e with its base and at least a portion of its side nested into the fourth bowl 100d, which has a slightly larger inner diameter than the outer diameter of the fifth bowl 100e, allowing the fifth bowl 100e to fit within. However, it is understood that the nesting of the fifth bowl 100e into the fourth bowl 100d may be a tight fit, a loose fit, and/or may have any amount of the fifth bowl 100e visible above the upper edge of the fourth bowl 100d. FIG. 3 additionally shows the fourth bowl 100d nested into the third bowl 100c, the third bowl 100c nested into the second bowl 100b, and the second bowl 100b nested into the first bowl 100a in a similar way to how the fifth bowl 100e is nested into the fourth bowl 100d. The nature of the nesting may be similar to nesting dolls.

As illustrated by the nesting aspect of the kit 20, the bowls may be different sizes. Each of these different sizes may allow for each bowl to be used to measure different varieties of food type 200 and may each correspond to a certain quantity of a macronutrient in the respective food types 200. For example, if the user 10 wished to have each bowl of the kit 20 measure about 15 grams of carbohydrates, each of the five bowls illustrated in FIG. 3, when filled to a specific point (e.g., only covering the base of the bowl, filled to a particular line in the bowl, filled to the top edge of the bowl, and the like) with the appropriate food type 200 for that bowl, will each contain approximately 15 grams of carbohydrates.

Due to the sizing of the bowls, the user 10 may have some certainty that they are consuming the quantity of the macronutrient they are attempting to measure. For example, if the fifth bowl 100e is meant to be filled to the top edge with almonds, the volume of the fifth bowl 100e would be roughly equal to the volume of almonds and, assuming the macronutrient density is approximately the same between each almond, the user 10 can be relatively certain the fifth bowl 100e contains a certain quantity of the desired macronutrient. This is beneficial because it allows the user 10 to fill one bowl with a specific food type 200 and know, to some reasonable degree of certainty, the amount of a macronutrient they are consuming rather than having to weigh their food, find the macronutrient density of that food themselves, calculate how much of that food corresponds to the macronutrient quantity they want to consume, and portion their food to what they believe is the correct amount.

FIG. 3 also shows a first color 300, a second color 302, a third color 304, a fourth color 306, and a fifth color 308 on the top edge of the first bowl 100a, the second bowl 100b, the third bowl 100c, the fourth bowl 100d, and the fifth bowl 100e, respectively. In some examples, these colors are each different, and each corresponds to a specific food type 200 to allow the user 10 to easily determine which bowl corresponds to the food type 200 they would like to measure. It should be noted that each "color" may comprise a solid color, a color gradient, a pattern, one or multiple images, text, and/or any number of other design(s) to signify a particular food type 200. For example, each "color" in FIG. 3 and the following figures is represented by a different pattern comprising black and white (e.g., dots, stripes, cross-hatching, and the like).

While only five bowls are shown in FIG. 3, it is understood that the kit 20 may include less than five bowls and up to as many as desired. It is also understood that the kit 20 may include other types of instruments capable of containing an item such as food (e.g., containers, serving dishes, serving utensils, measuring cups, and the like).

Figure 4:
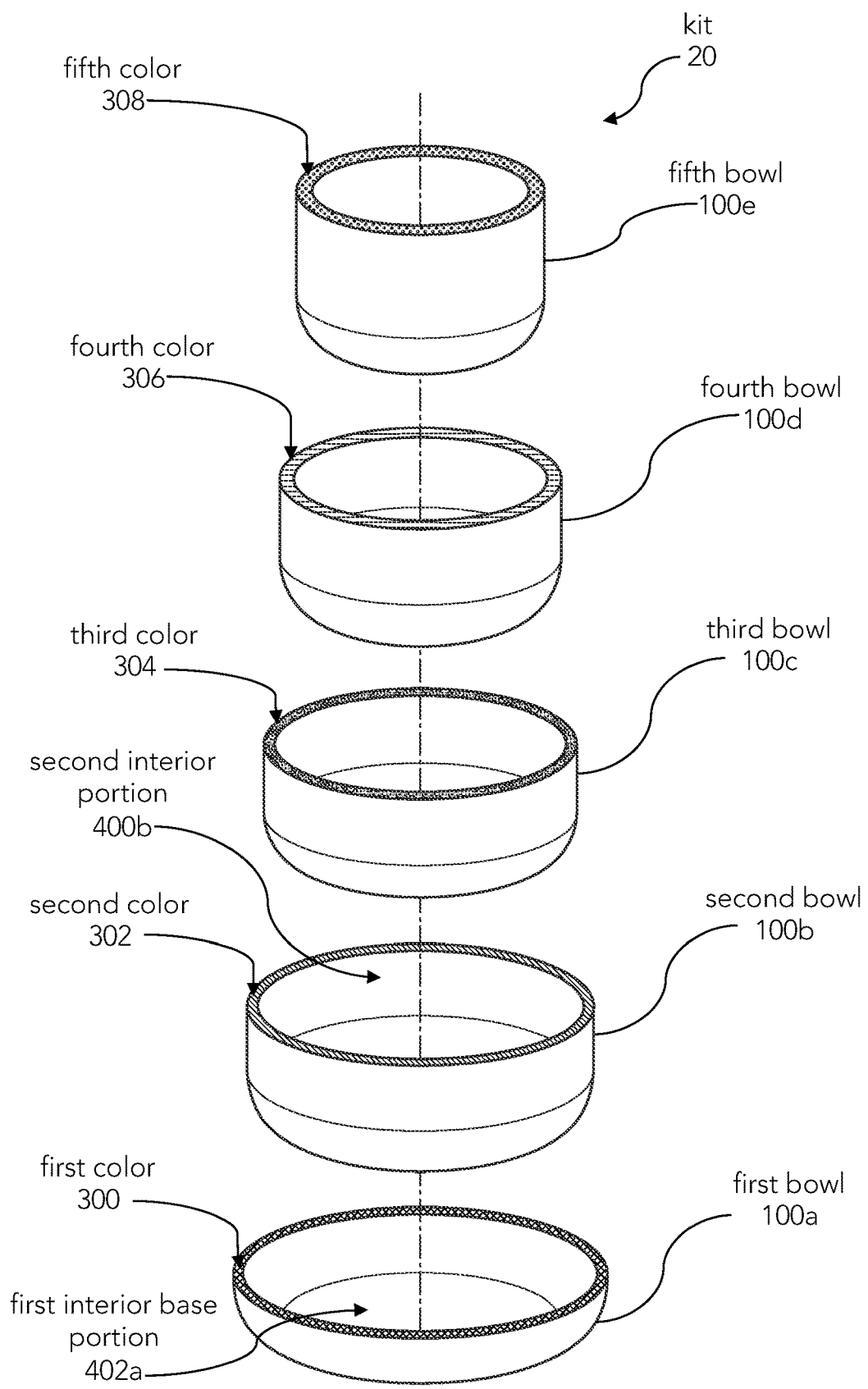
FIG. 4 illustrates an exploded perspective view of the kit of bowls seen in FIG. 3, according to some examples.

FIG. 4 illustrates an exploded perspective view of the kit 20 seen in FIG. 3, whereby the bowls do not contain any food, according to some examples. This figure shows one example of the order in which the first bowl 100a, the second bowl 100b, the third bowl 100c, the fourth bowl 100d, and the fifth bowl 100e may nest together. Also shown are the first color 300, the second color 302, the third color 304, the fourth color 306, and the fifth color 308 on the top edge of each of the previously listed bowls, respectively. Additionally, FIG. 4 illustrates each of the five bowls of the kit 20 as empty, so a first interior base portion 402a of the first bowl 100a can be observed. Also seen more clearly due to the empty illustration of the bowls is a second interior portion 400b of the second bowl 100b. The side of each bowl is shown to extend from the interior base portion 402 and to define the interior portion 400. However, as previously stated, this is only one example of the types, shapes, and sizes of the containers in the kit 20.

Figure 5:
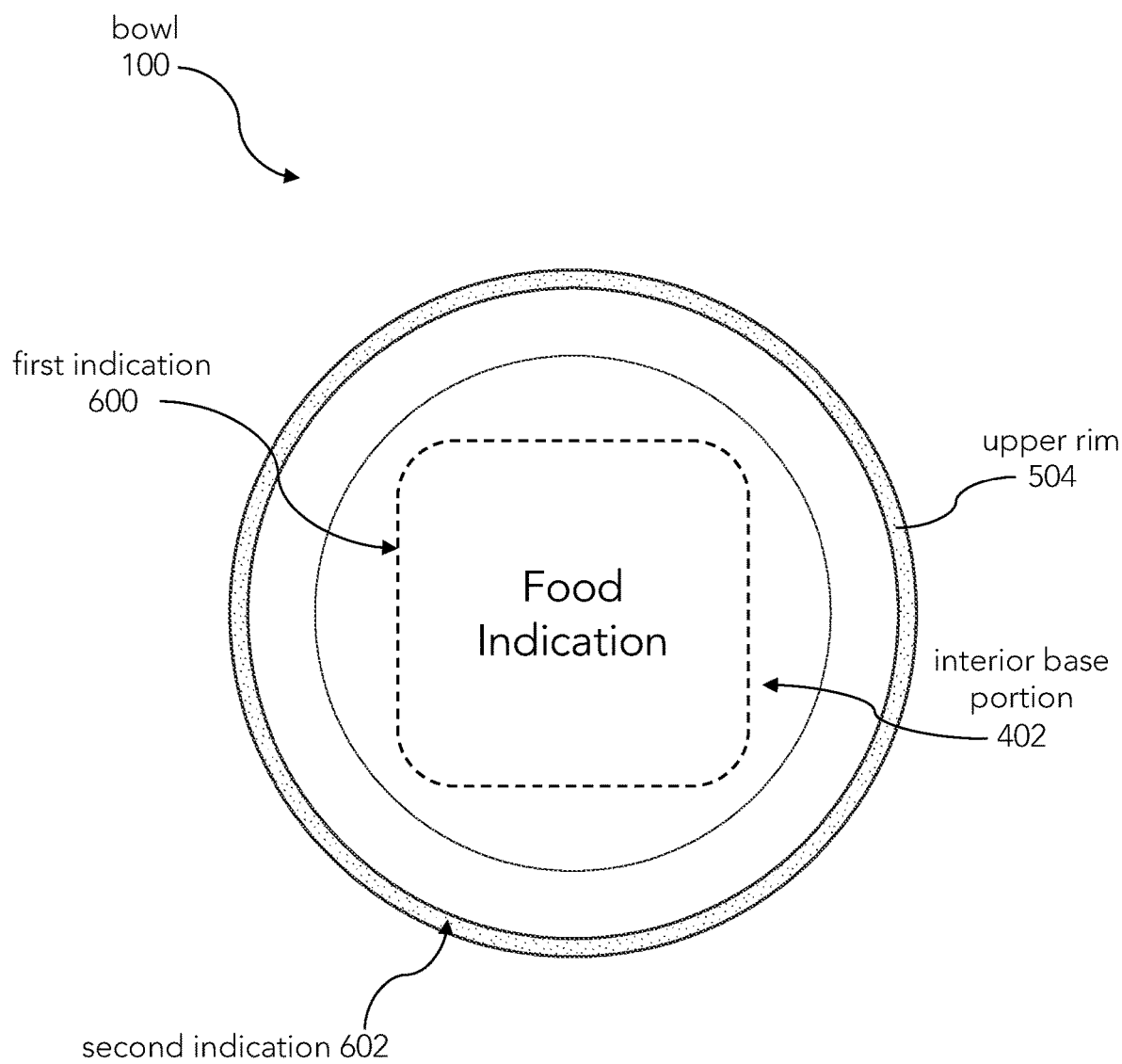
FIG. 5 illustrates a top view of a bowl, according to some examples.

FIG. 5 illustrates a top view of a bowl 100, whereby the bowl 100 does not contain any food, according to some examples. This figure shows one example of a general bowl that may be any of the previously mentioned bowls or another bowl. FIG. 5 additionally shows a first indication 600 on the top of the interior base portion 402 of the bowl 100. The first indication 600 may be located on the interior base portion 402, although this is not a requirement. FIG. 5 also illustrates a second indication 602 on an upper rim 504 of the bowl 100. The upper rim 504 may include a portion and/or up to the entire top edge of the bowl 100. The second indication 602 may be located on the upper rim 504, although this is not a requirement. The first indication 600 and/or the second indication 602 may give an indication as to the identity of the food type 200 and may be in multiple locations on the bowl 100. The first indication 600 and the second indication 602 may be any type of indication (e.g., a word, multiple words, an image, a color, a pattern, and the like).

Figure 6:
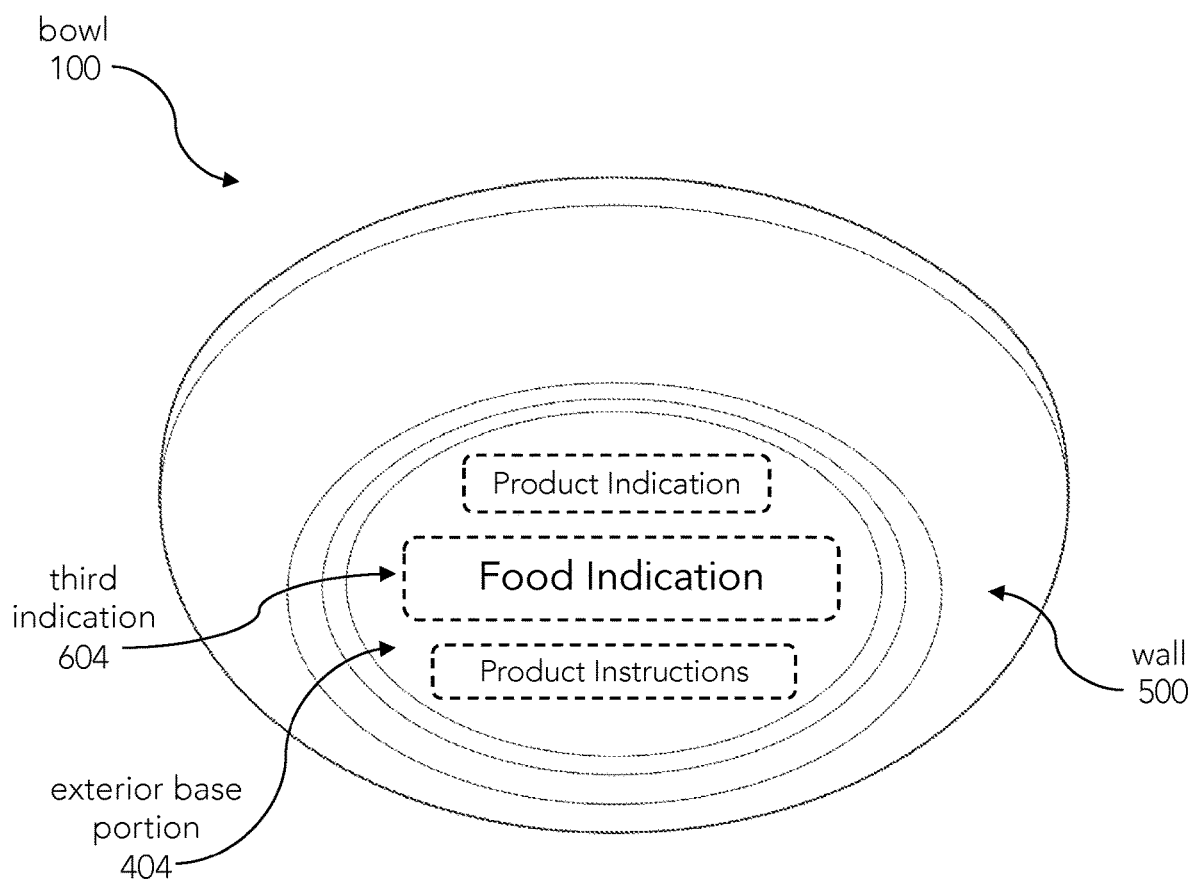
FIG. 6 illustrates a bottom perspective view of a bowl, according to some examples.

FIG. 6 illustrates a perspective bottom view of the bowl 100, according to some examples. Similar to FIG. 5, the bowl 100 in FIG. 6 is one example of a general bowl that may be any of the previously mentioned bowls or another bowl. FIG. 6 also shows the bowl 100 with a wall 500 extending from the exterior base portion 404. The wall 500 may extend up to the upper rim 504, as shown in FIG. 5.

Additionally, FIG. 6 illustrates a third indication 604 on the exterior base portion 404, although this is not a requirement. The third indication 604 may give an indication as to the identity of the food type 200 and may be in multiple locations on the bowl 100. The third indication 604 may be any type of indication (e.g., a word, multiple words, an image, a color, a pattern, and the like). In addition, the third indication 604 may include an indication of the product, an indication of how to use or not use the product, and/or other details, such as brand or manufacturing information. While the first indication 600 and the third indication 604 are illustrated as "Food Indication," it should be appreciated that the first indication 600 can be different than the third indication 604 and/or the second indication 602. For example, the first indication 600 may include a graphical illustration of the food type 200, while the third indication 604 may include a textual description of the food type 200. In some examples, the first indication 600 may be an indication of the food type 200 and the third indication 604 may be an indication of the instructions for how to use the bowl 100.

Figure 7:
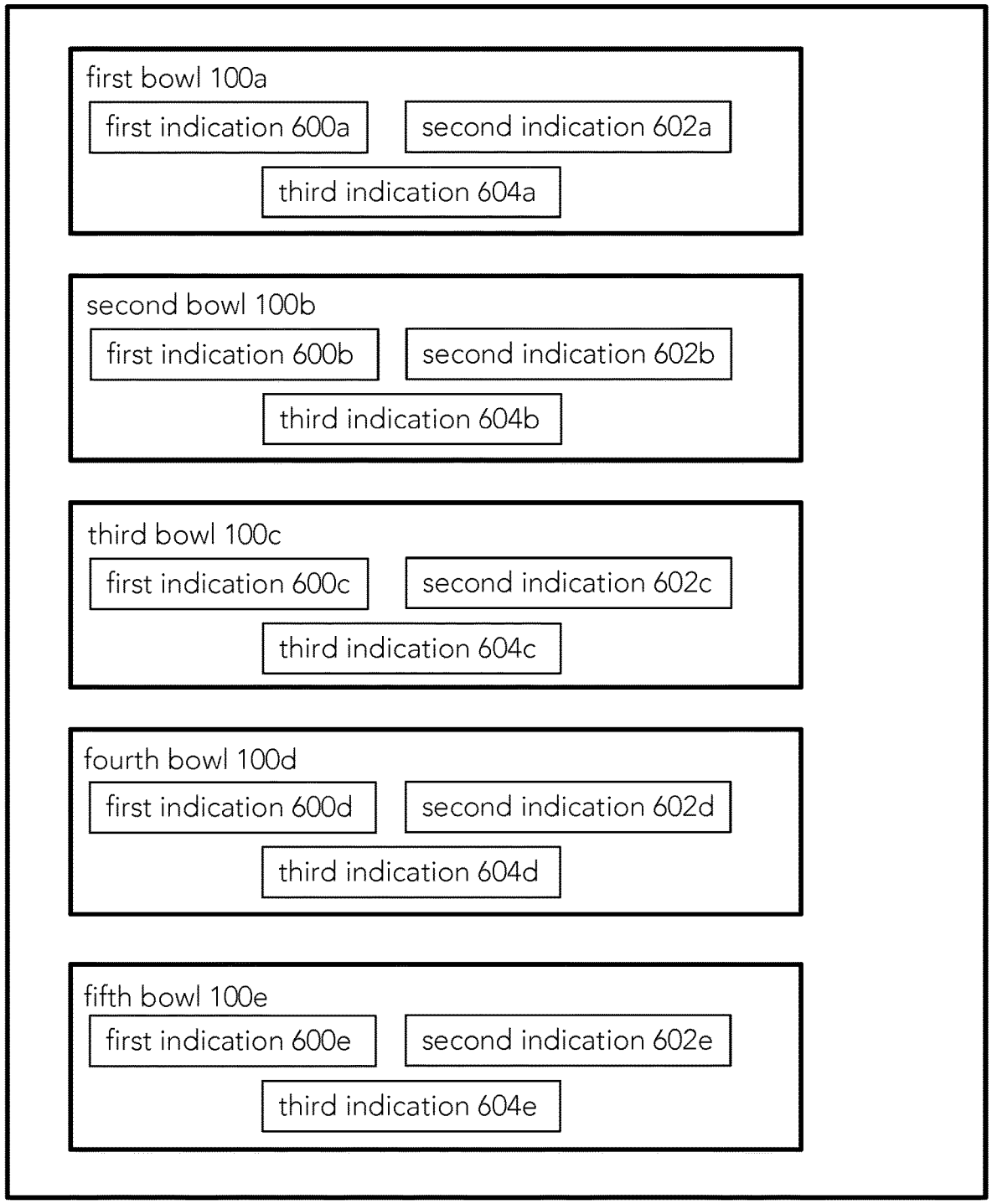
FIG. 7 illustrates a schematic of the kit of bowls, according to some examples.

FIG. 7 illustrates a schematic representation of the kit 20. The kit 20 is shown outside of a largest box to show that each box and component inside of the largest box may be included in the kit 20. FIG. 7 additionally illustrates a set of five medium boxes within the largest box. Each of these five medium boxes is labeled as first bowl 100a, second bowl 100b, third bowl 100c, fourth bowl 100d, and fifth bowl 100e, respectively. In some examples, this represents that each of the five bowls is included in the kit 20. Further, within each of the medium boxes are three smaller boxes labeled as the first indication 600, the second indication 602, and the third indication 604 for each of the five bowls. The smallest boxes placed inside of the medium boxes may represent that the first indication 600, the second indication 602, and the third indication 604 for each bowl may be included on their respective bowls as part of the kit 20.

Figure 8:
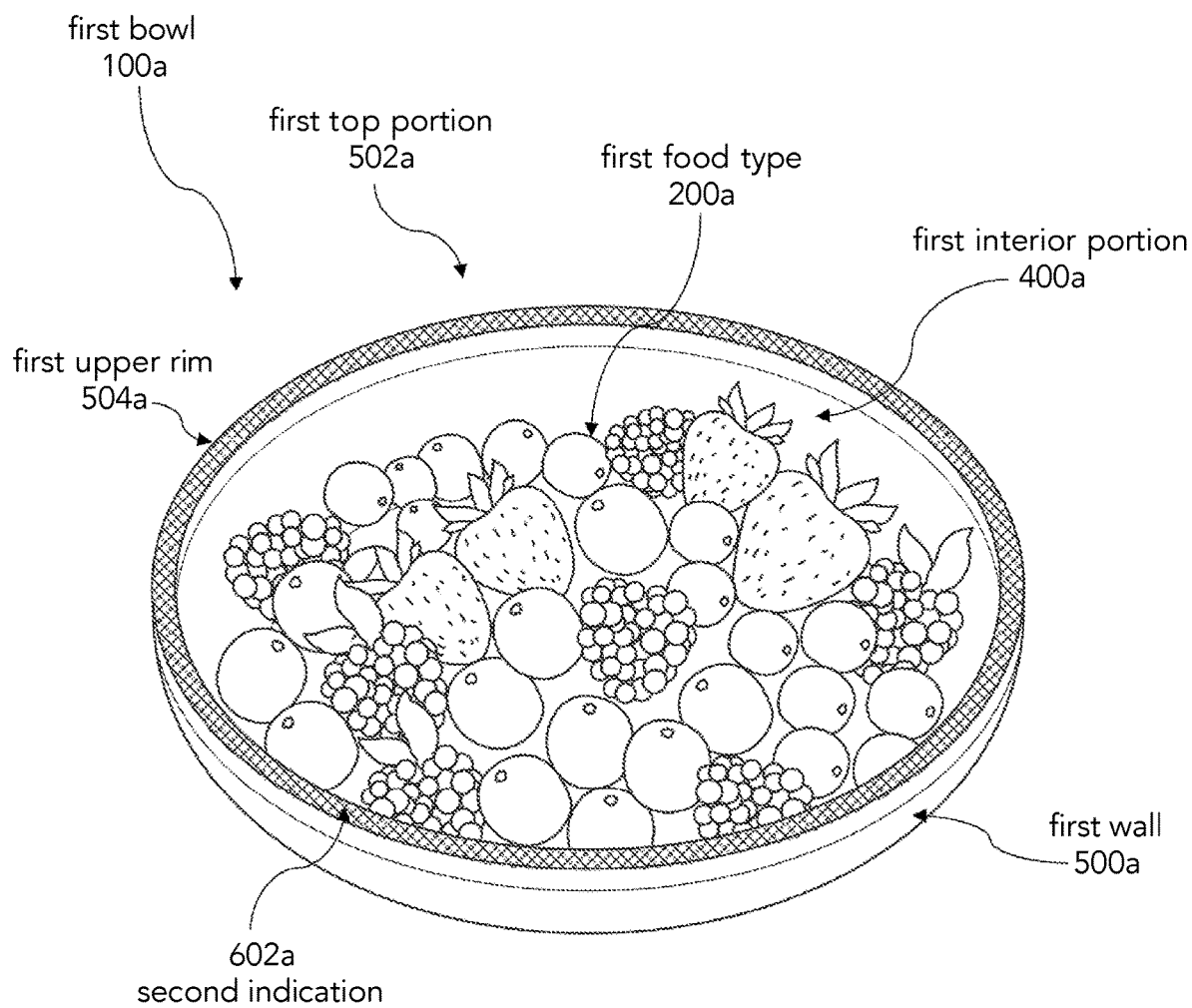
FIG. 8 illustrates a top perspective view of a first bowl of the kit holding berries, according to some examples.

FIG. 8 illustrates a perspective view of the first bowl 100a holding berries, according to some examples. The figure displays one example where the berries are defined as a first food type 200a, although the first food type 200a may be any type of food the bowl is designed to hold. The example of the first bowl 100a in this figure is depicted with a first wall 500a and a first upper rim 504a, both of which may define a first top portion 502a of the first bowl 100a and may hold the berries inside the first interior portion 400a of the first bowl 100a. While the first top portion 502a is depicted as being open, this is understood to not be a requirement as the first bowl 100a may include a cover or other item over the first bowl 100a so that the first top portion 502a is closed or semi-closed. FIG. 8 also illustrates the second indication 602a, which, as previously mentioned, may be any type of indication (e.g., a word, multiple words, an image, a color, a pattern, and the like).

Figure 9:
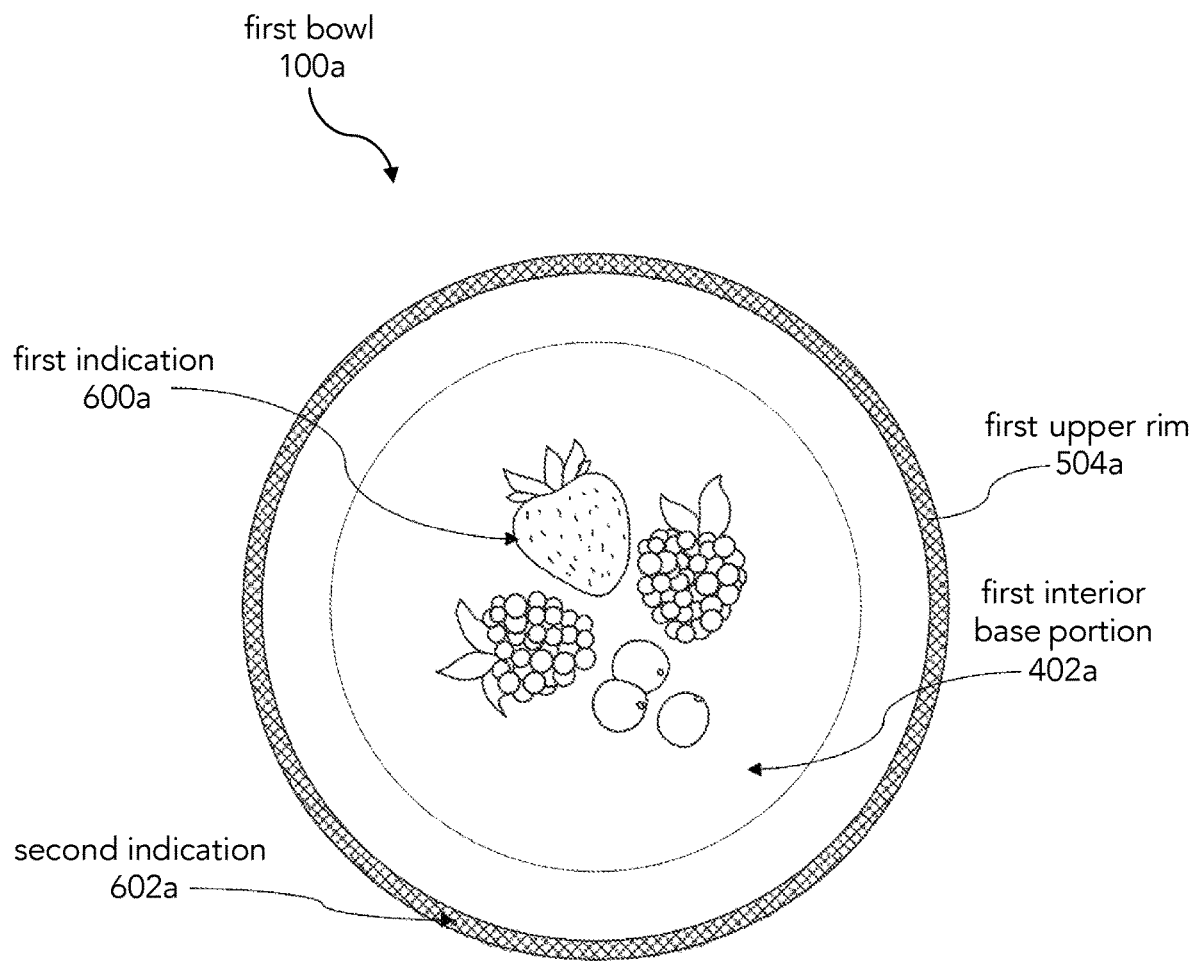
FIG. 9 illustrates a top view of the first bowl of the kit, according to some examples.

FIG. 9 illustrates a top view of the first bowl 100a that holds a specific type of food, whereby the bowl does not contain any food, according to some examples. This figure shows the first bowl 100a as a round bowl, although it is understood that the first bowl 100a may be a different instrument capable of containing a food item (e.g., a container, a serving dish, a serving utensil, a measuring cup, and the like) and may be a different shape. Other possible shapes include square, rectangular, oblong, and/or "novelty" shapes (i.e., star, holiday tree, pumpkin, heart, and the like). FIG. 9 also shows the first indication 600a as a visual representation of a group of berries located on the first interior base portion 402a, although this is not a requirement. Also illustrated in FIG. 9 is the first upper rim 504a with the second indication 602a. In some examples, the second indication 602a comprises a color, represented in FIG. 9 as a cross-hatched pattern, corresponding to the first food type 200a. To reiterate, the first indication 600a and/or the second indication 602a may be any type of indication (e.g., a word, multiple words, an image, a color, a pattern, and the like).

Figure 10:
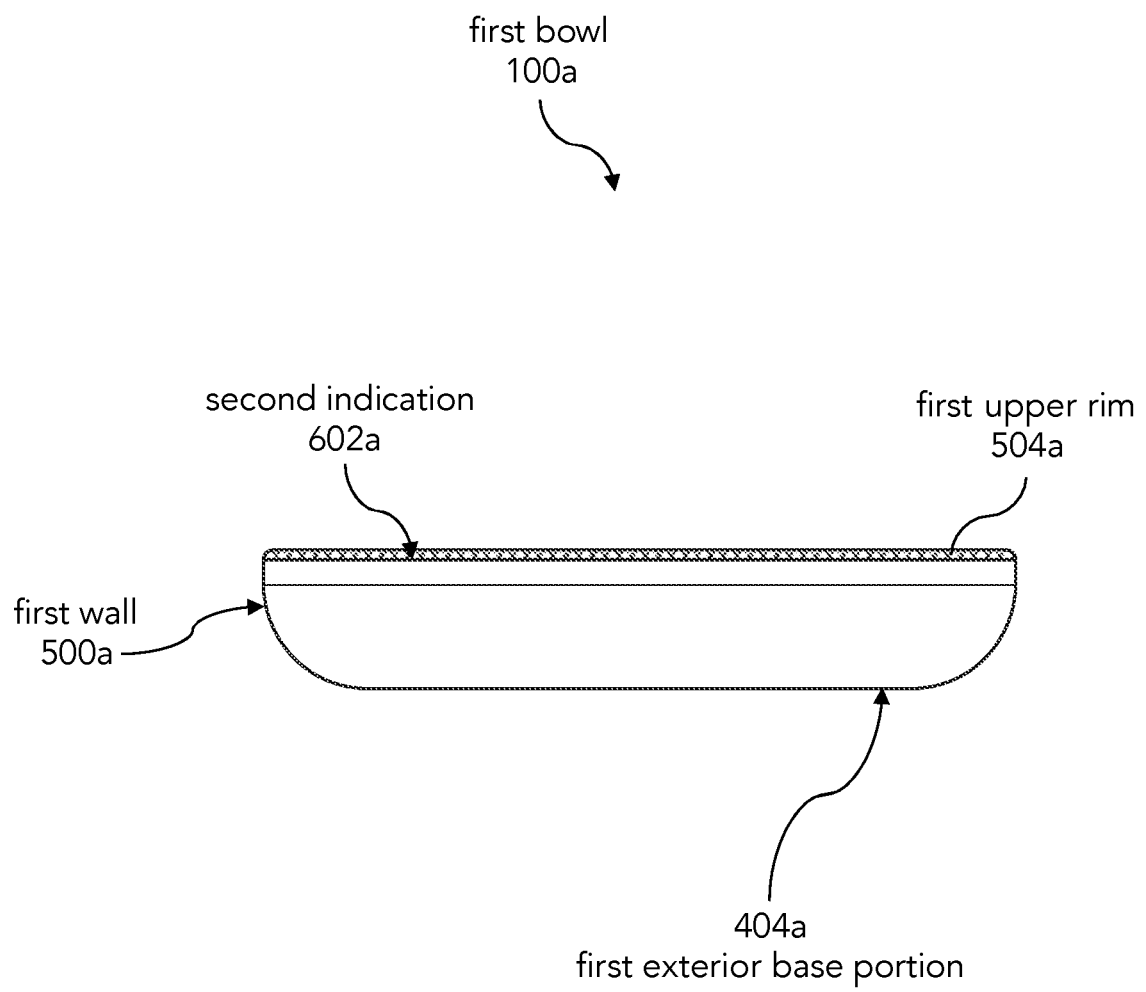
FIG. 10 illustrates a side view of the first bowl of the kit, according to some examples.

FIG. 10 illustrates a side view of the first bowl 100a, according to some examples. FIG. 10 shows the first bowl 100a with a first exterior base portion 404a, a first wall 500a extending from the first exterior base portion 404a, and the first upper rim 504a at the top of the first wall 500a. This figure additionally shows the second indication 602a on the first upper rim 504a of the first bowl 100a and illustrates how the second indication 602a may be visible from the side.

Figure 11:
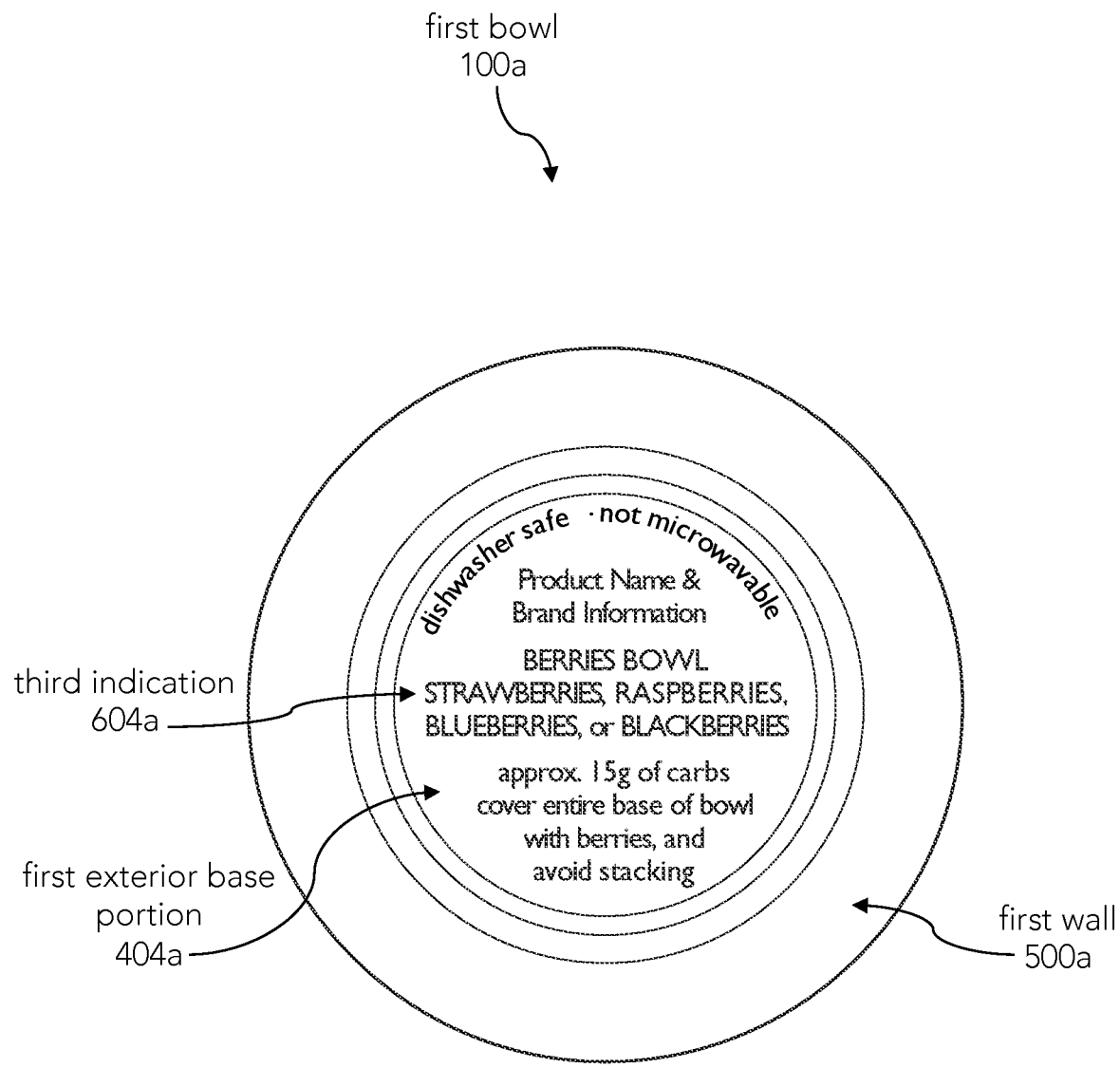
FIG. 11 illustrates a bottom view of the first bowl of the kit, according to some examples.
Figure 12:
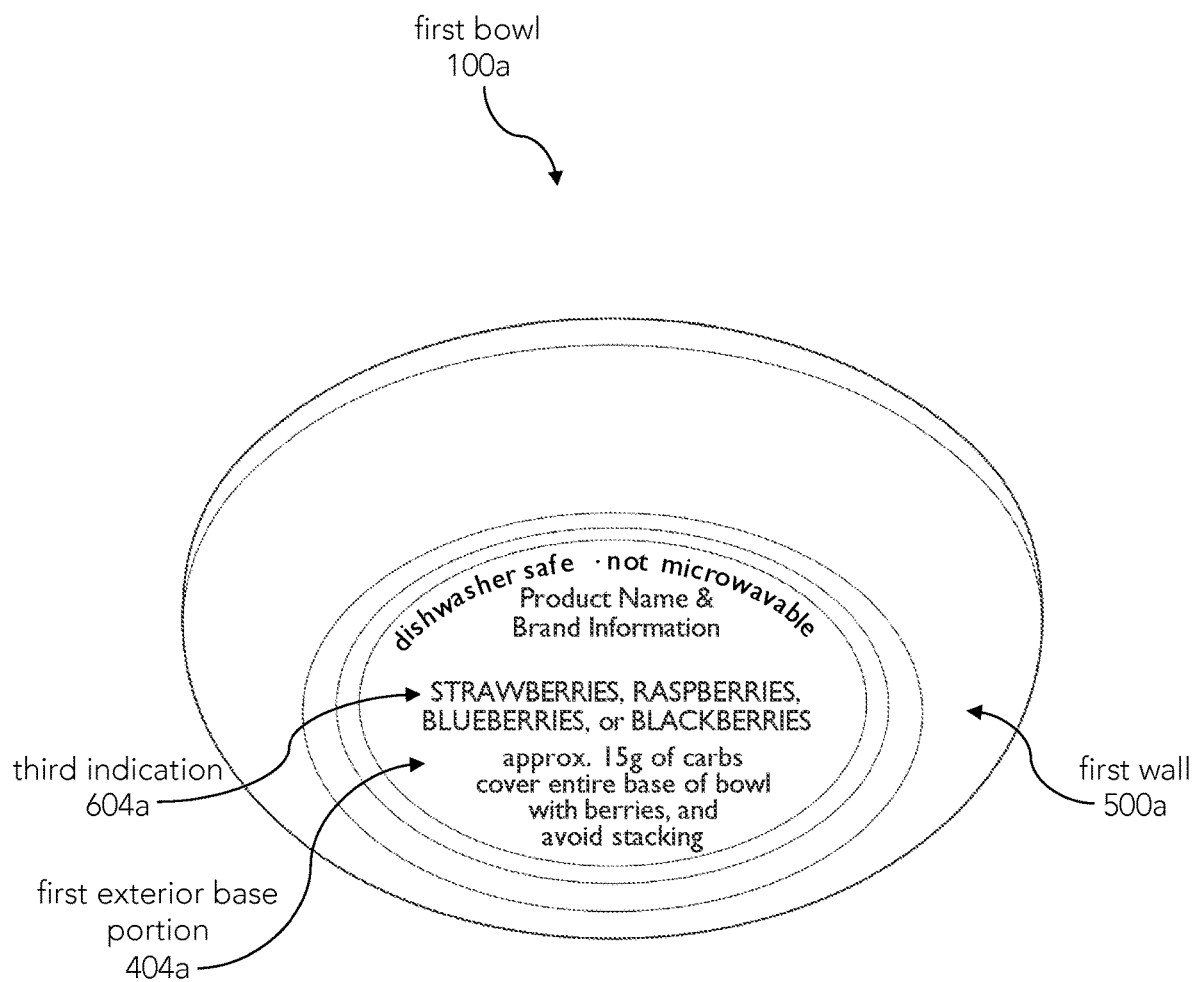
FIG. 12 illustrates a bottom perspective view of the first bowl of the kit, according to some examples.

FIG. 11 illustrates a bottom view, and FIG. 12 illustrates a bottom perspective view of the first bowl 100a, according to some examples. Like previous figures, FIGS. 11 and 12 show the first bowl 100a as a bowl, with the first wall 500a of the bowl extending from the first exterior base portion 404a. Also illustrated in these figures is the third indication 604a located on the first exterior base portion 404a which may provide a suggestion as to the identity of the first food type 200a the first bowl 100a is intended to contain. However, it is understood that the third indication 604a may also and/or alternatively provide other information (e.g., how to use the bowl, how not to use the bowl, what quantity of macronutrients of the first food type 200a the bowl is meant to measure, and the like). Additionally, FIGS. 11 and 12 show the third indication 604a to include a series of words. However, it is understood that the third indication 604a may contain any type of indication (e.g., a word, multiple words, an image, a color, a pattern, and the like).

Figure 13:
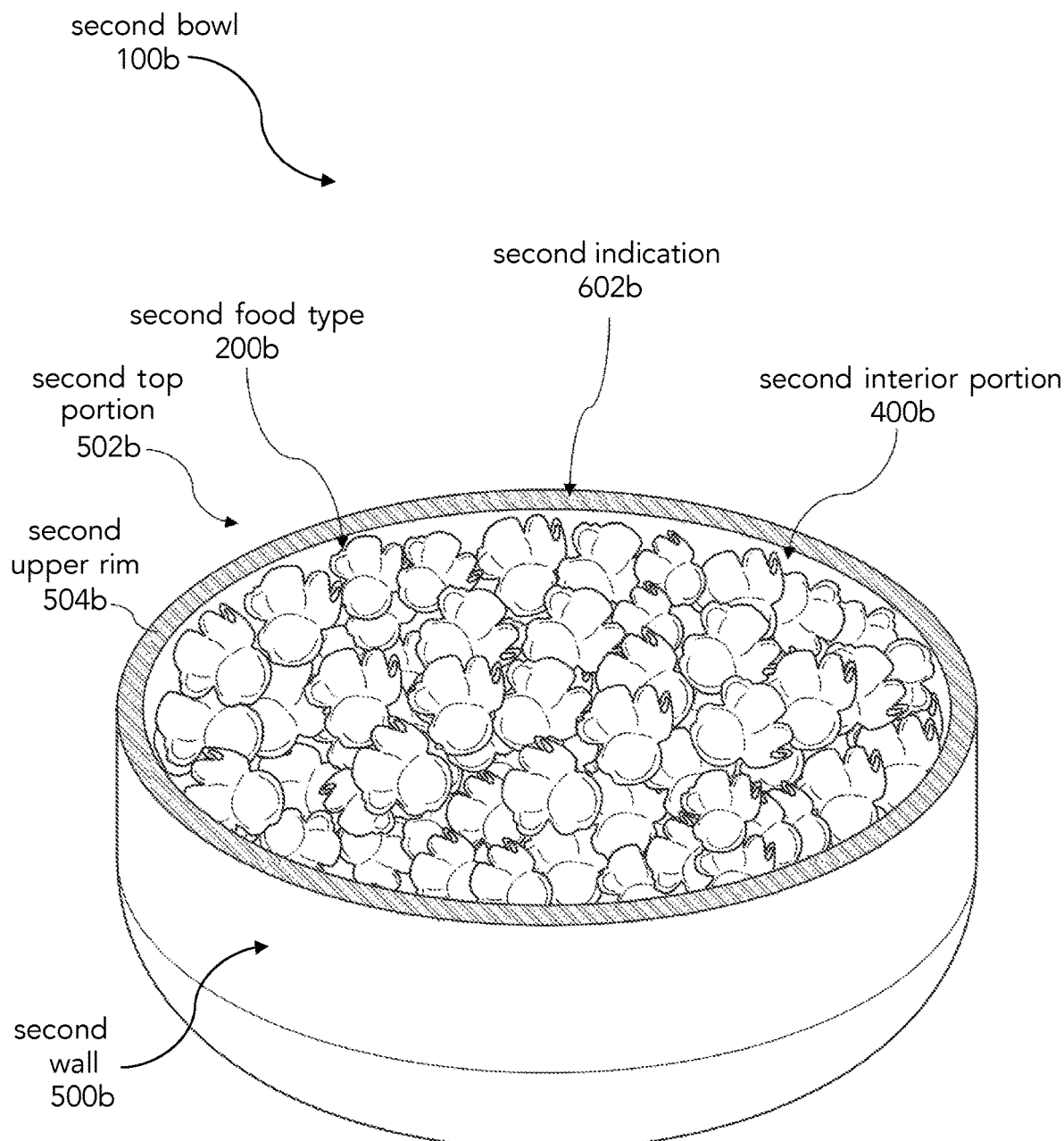
FIG. 13 illustrates a top perspective view of a second bowl of the kit holding popcorn, according to some examples.

FIG. 13 illustrates a similar perspective view to that of FIG. 8, this time showing the second bowl 100b holding popcorn, according to some examples. To reiterate and expand on some of the differences, FIG. 13 displays one example where the popcorn is defined as a second food type 200b; although the second food type 200b may be any type of food the second bowl 100b is designed to hold. The example of the second bowl 100b in this figure is depicted with a second wall 500b and a second upper rim 504b, both of which may define the second top portion 502b of the second bowl 100b and may hold the popcorn inside the second interior portion 400b of the bowl. As previously mentioned, while the second top portion 502b is depicted as being open, this is understood to not be a requirement as the second bowl 100b may include a cover or other item over the second bowl 100b so that the second top portion 502b is closed or semi-closed. FIG. 13 also illustrates the second indication 602b, which, as previously mentioned, may be any type of indication (e.g., a word, multiple words, an image, a color, a pattern, and the like).

Figure 14:
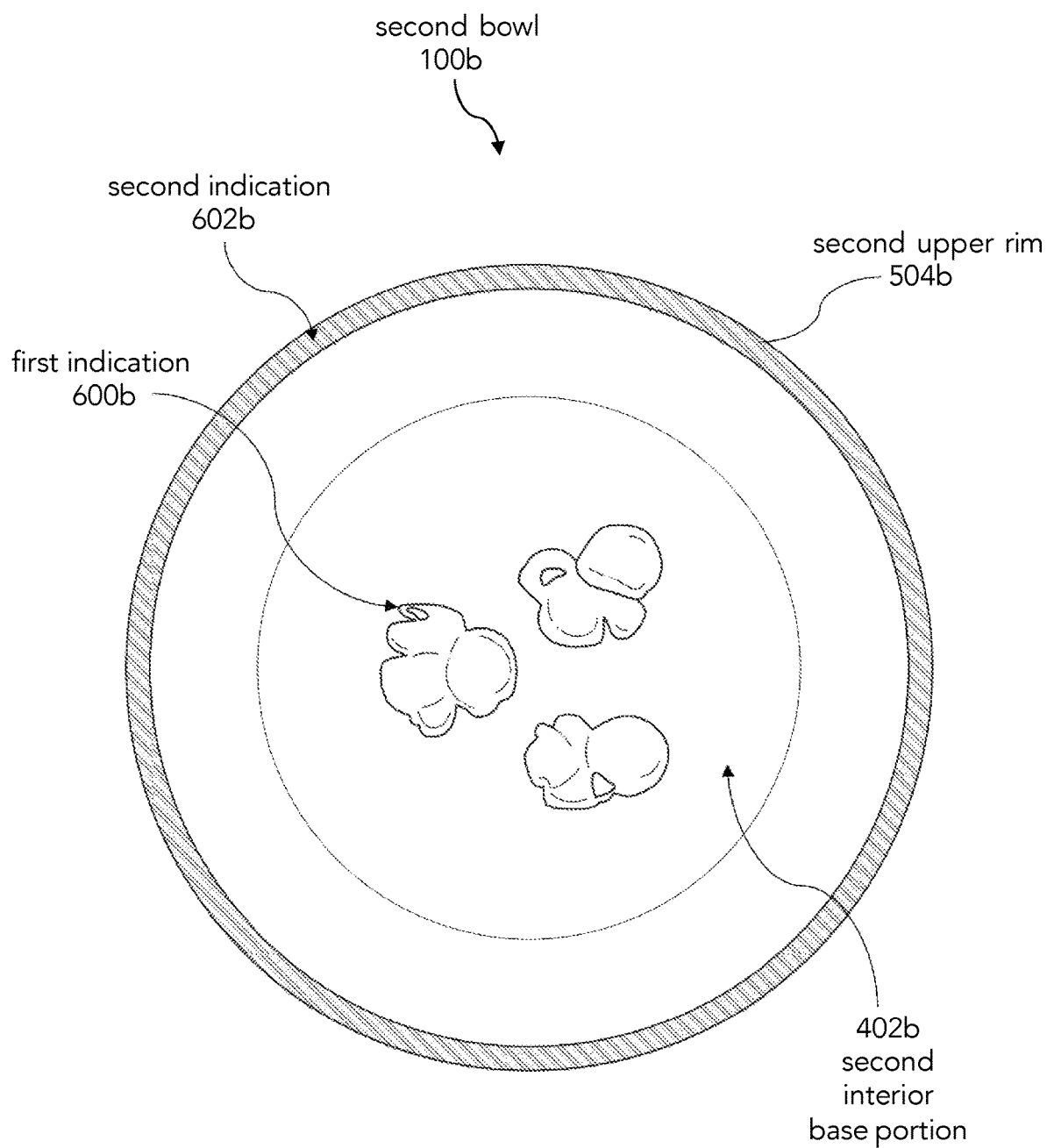
FIG. 14 illustrates a top view of the second bowl of the kit, according to some examples.

FIG. 14 illustrates a similar top view to that of FIG. 9, whereby the bowl does not contain any food, according to some examples. To reiterate, FIG. 14 illustrates a top view of the second bowl 100b shown in FIG. 13. This figure shows the second bowl 100b as a round bowl, although it is understood that the second bowl 100b may comprise other forms of instruments capable of containing an item such as food (e.g., containers, serving dishes, serving utensils, measuring cups, and the like) and may be different shapes. Other possible shapes include square, rectangular, oblong, and/or "novelty" shapes (i.e., star, holiday tree, pumpkin, heart, and the like). FIG. 14 also shows the first indication 600b as a visual representation of a few pieces of popcorn on the top of the second interior base portion 402b, although this is not a requirement. Also illustrated in FIG. 14 is the second upper rim 504b with the second indication 602b. In some examples, the second indication 602b comprises a color, represented in FIG. 14 as a striped pattern, corresponding to the second food type 200b. The first indication 600b and/or the second indication 602b may be any type of indication (e.g., a word, multiple words, an image, a color, a pattern, and the like).

Figure 15:
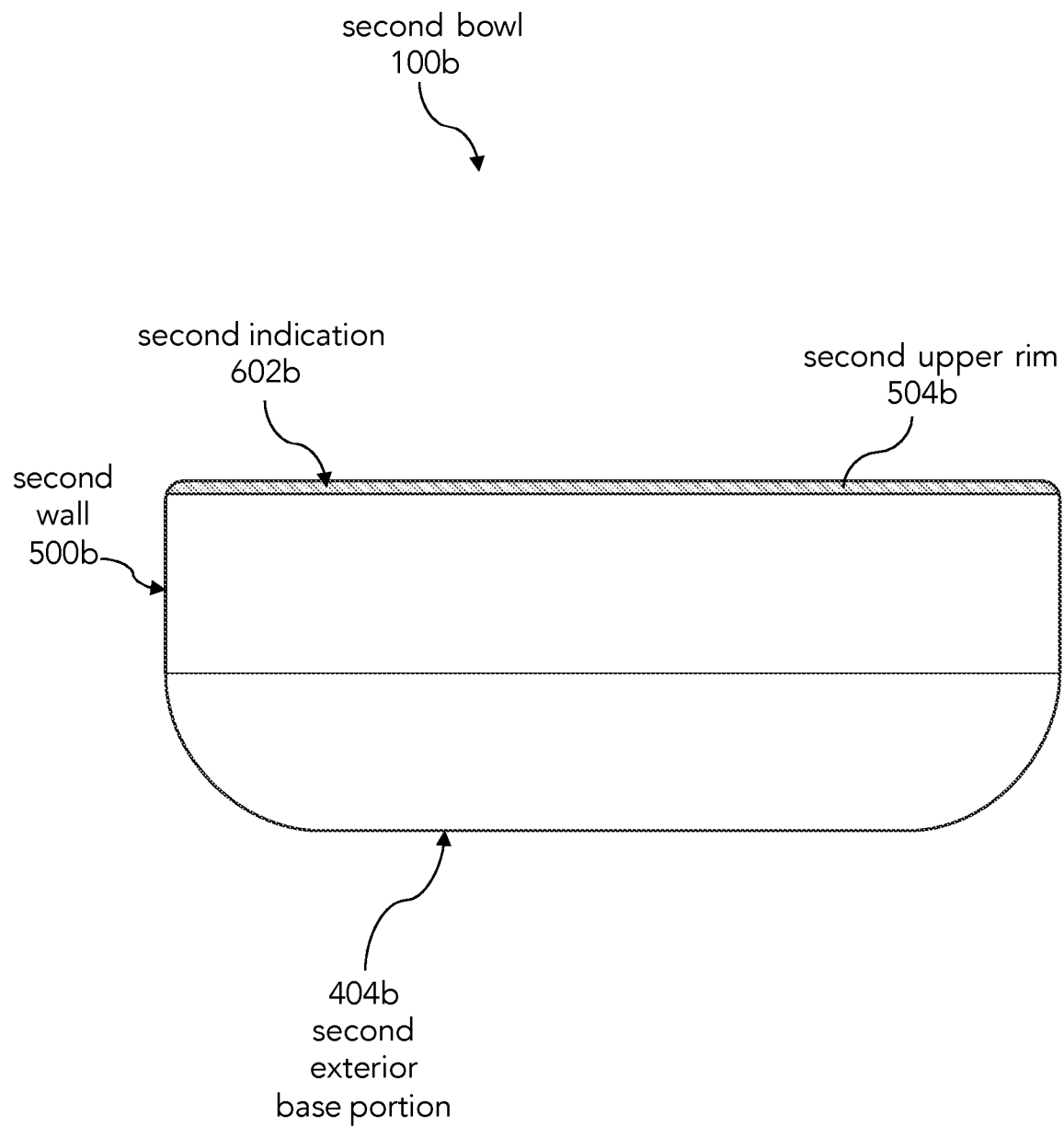
FIG. 15 illustrates a side view of the second bowl of the kit, according to some examples.

FIG. 15 illustrates a similar side view to that of FIG. 10, according to some examples. To reiterate, the second bowl 100b of FIG. 15 may hold a specific type of food. Like previous figures, FIG. 15 shows the second bowl 100b with a second exterior base portion 404b, a second wall 500b extending from the second exterior base portion 404b, and the second upper rim 504b at the top of the second wall 500b. This figure additionally shows the second indication 602b on the second upper rim 504b of the second bowl 100b and illustrates how the second indication 602b may be visible from the side.

Figure 16:
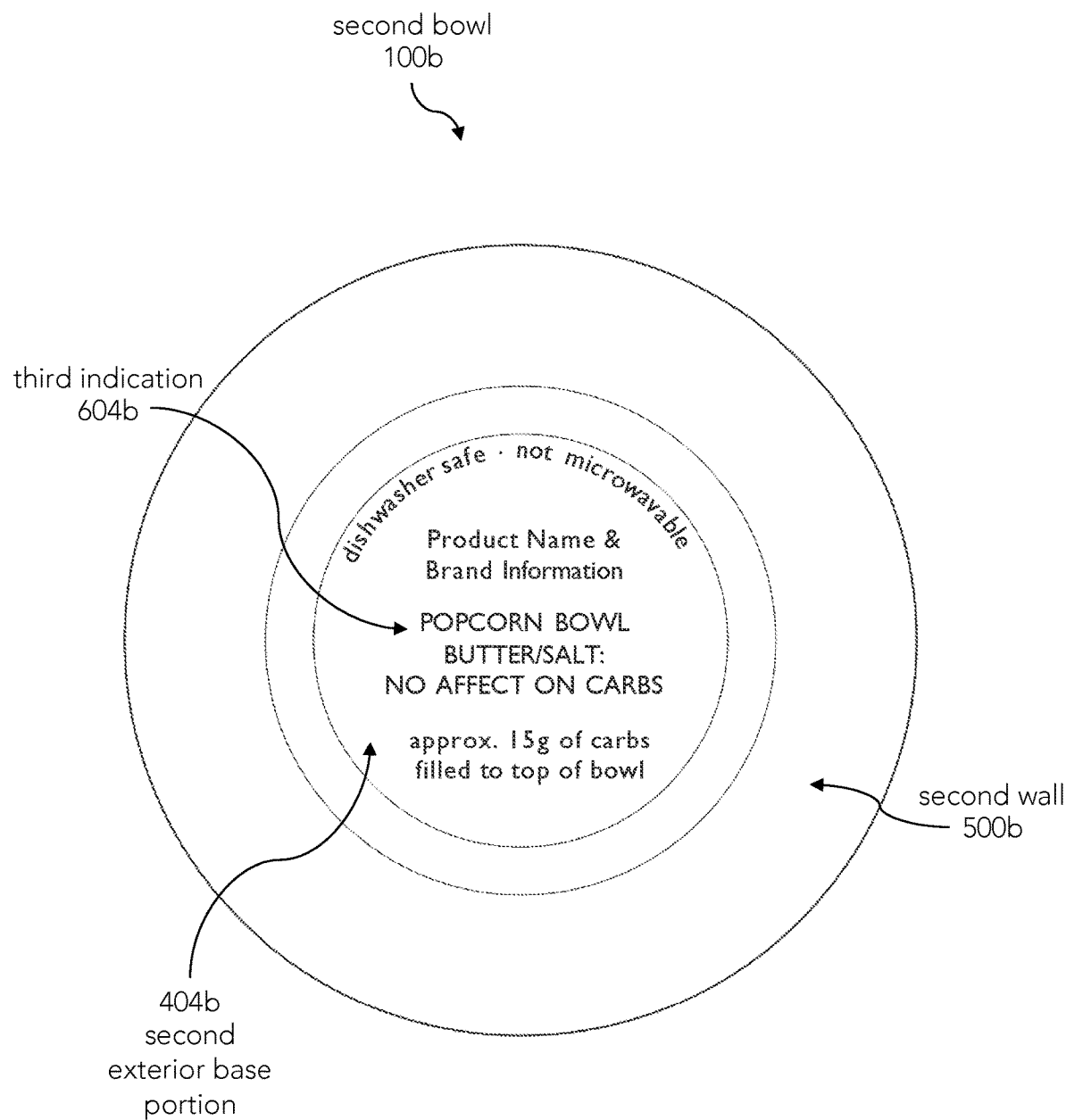
FIG. 16 illustrates a bottom view of the second bowl of the kit, according to some examples.

FIG. 16 illustrates a similar bottom view to that of FIG. 11, according to some examples. To reiterate, FIG. 16 shows a view of the second bowl 100b that holds a specific type of food and is depicted with the second wall 500b of the bowl extending from the second exterior base portion 404b. Also illustrated in this figure is the third indication 604b on the second exterior base portion 404b, which may provide a suggestion as to the identity of the second food type 200b the second bowl 100b is meant to contain. However, it is understood that the third indication 604b may also and/or alternatively provide other information (e.g., how to use the bowl, how not to use the bowl, what quantity of macronutrients of the second food type 200b the bowl is meant to measure, and the like). Additionally, FIG. 16 shows the third indication 604b as including a series of words. However, it is understood that the third indication 604b may contain any type of indication (e.g., a word, multiple words, an image, a color, a pattern, and the like).

Figure 17:
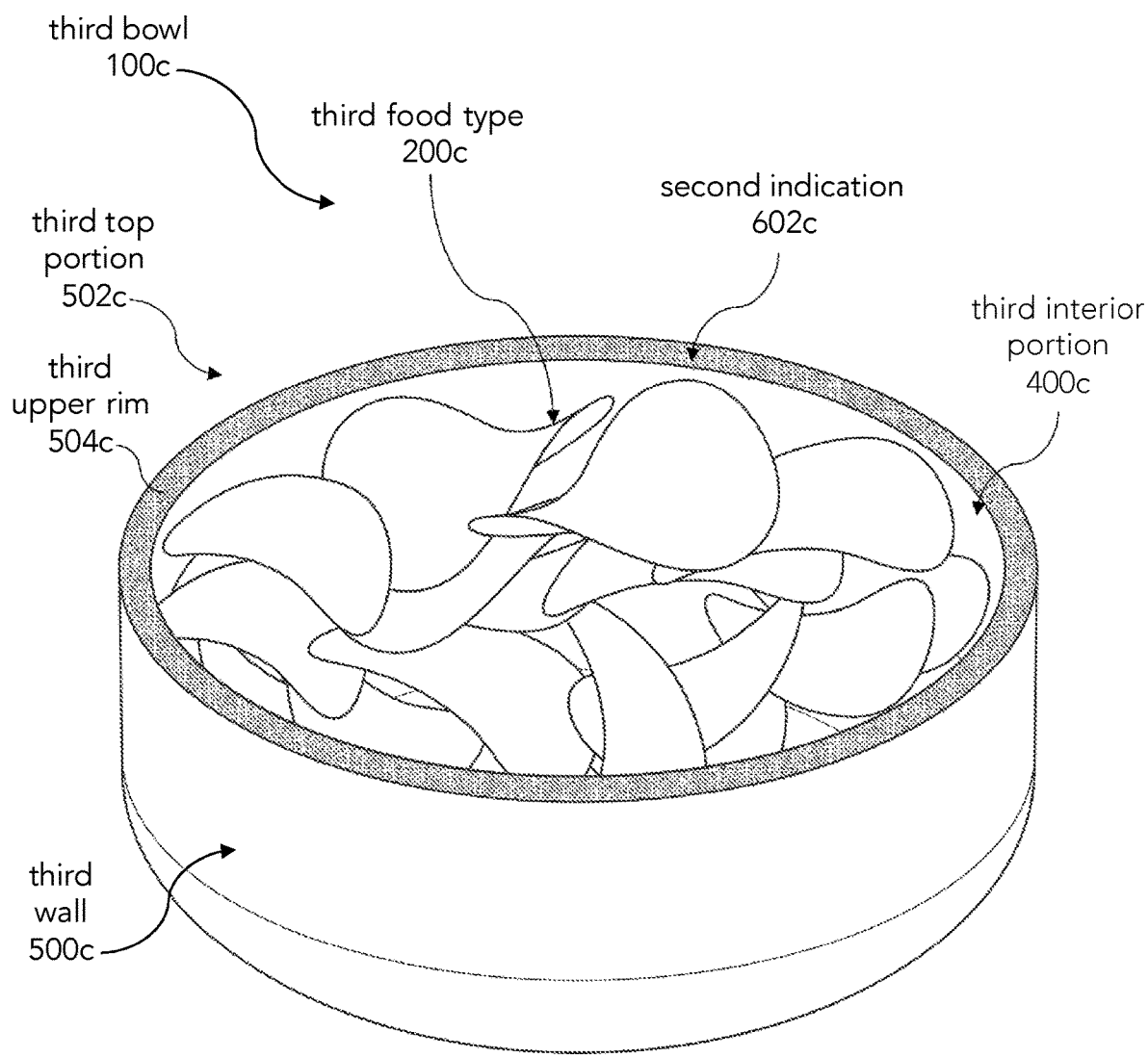
FIG. 17 illustrates a top perspective view of a third bowl of the kit holding chips, according to some examples.

FIG. 17 illustrates a similar perspective view to that of FIGS. 8 and 13, this time showing the third bowl 100c holding chips, according to some examples. To reiterate and expand on some of the differences, FIG. 17 displays one example where the chips are defined as a third food type 200c, although the third food type 200c may be any type of food the third bowl 100c is designed to hold. The example of the third bowl 100c in this figure is depicted with a third wall 500c and a third upper rim 504c, both of which may define a third top portion 502c of the third bowl 100c and may hold the chips inside the third interior portion 400c of the third bowl 100c. While the third top portion 502c is depicted as being open, this is understood to not be a requirement as the third bowl 100c may include a cover or other item over the third bowl 100c so that the third top portion 502c is closed or semi-closed. FIG. 17 also illustrates the second indication 602c, which, as previously mentioned, may be any type of indication (e.g., a word, multiple words, an image, a color, a pattern, and the like).

Figure 18:
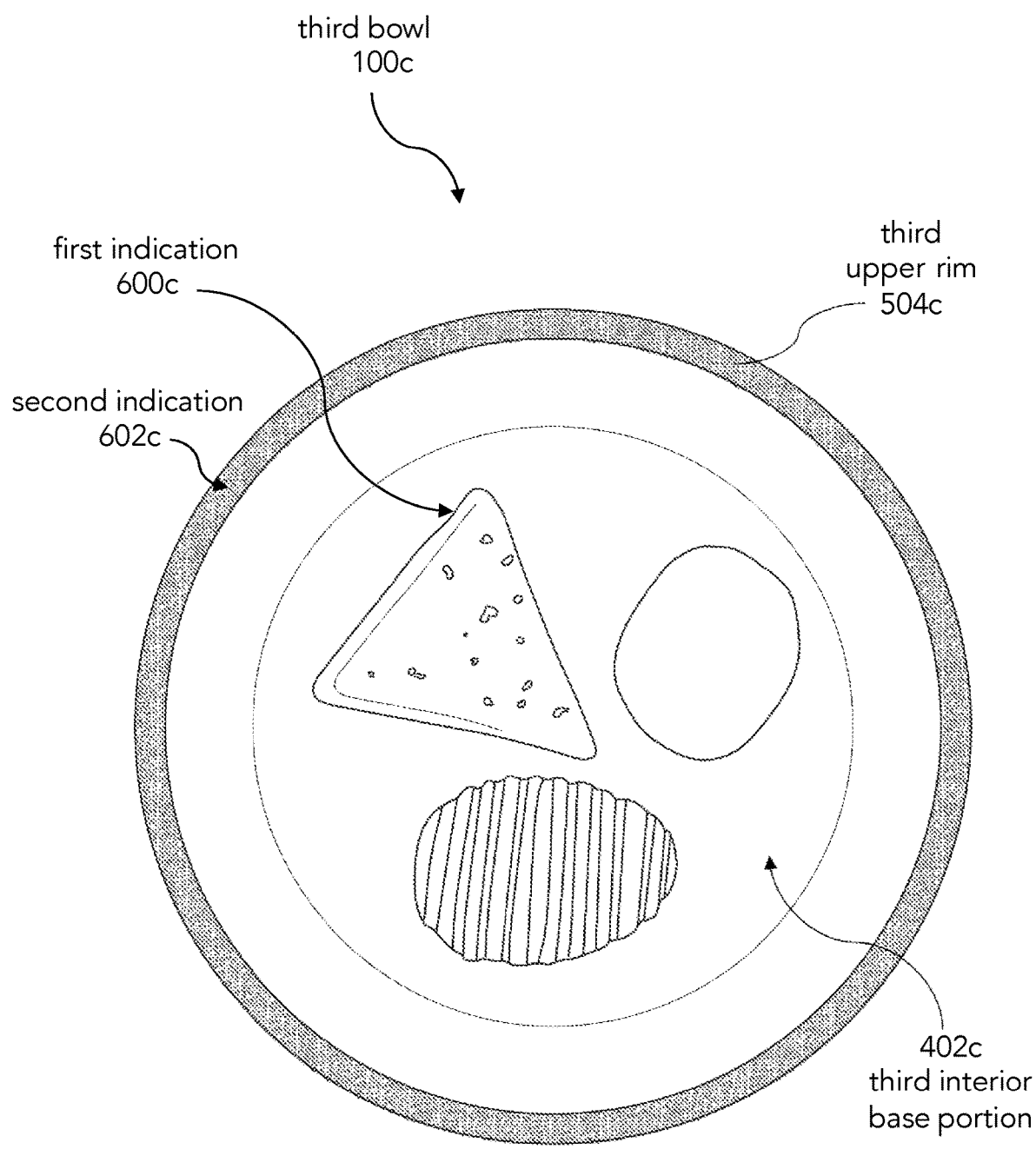
FIG. 18 illustrates a top view of the third bowl of the kit, according to some examples.

FIG. 18 illustrates a similar top view to that of FIGS. 9 and 14, whereby the bowl does not contain any food, according to some examples. To reiterate, FIG. 18 illustrates a top view of the third bowl 100c shown in FIG. 17. This figure shows the third bowl 100c as a round bowl, although it is understood that the third bowl 100c may be other forms of instruments capable of containing an item such as food (e.g., containers, serving dishes, serving utensils, measuring cups, and the like) and may be different shapes. Other possible shapes include square, rectangular, oblong, and/or "novelty" shapes (i.e., star, holiday tree, pumpkin, heart, and the like). FIG. 18 also shows the first indication 600c as a visual representation of chips located on the third interior base portion 402c, although this is not a requirement. Also illustrated in FIG. 18 is the third upper rim 504c with the second indication 602c. In some examples, the second indication 602c comprises a color, represented in FIG. 18 as a small dotted pattern, corresponding to the third food type 200c. The first indication 600c and/or the second indication 602c may be any type of indication (e.g., a word, multiple words, an image, a color, a pattern, and the like).

Figure 19:
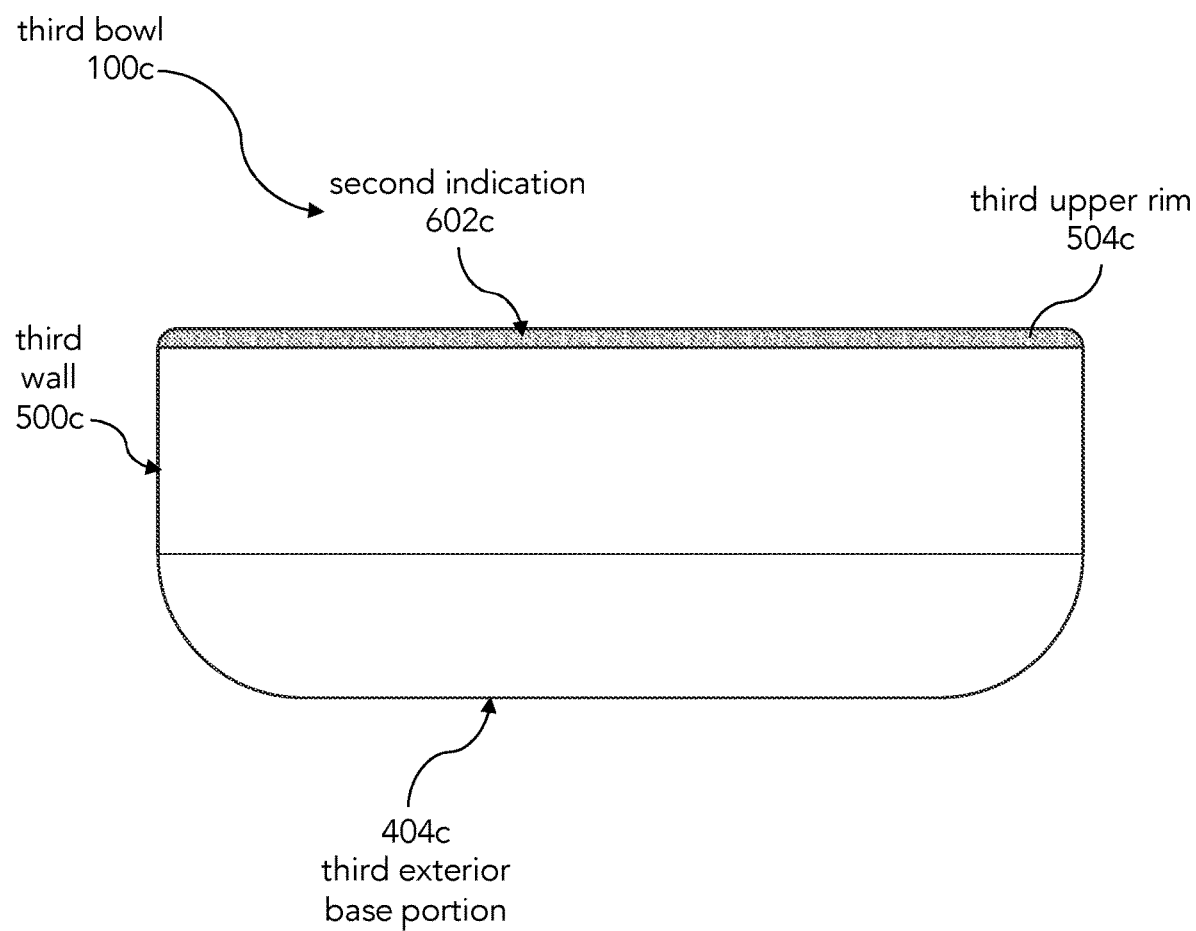
FIG. 19 illustrates a side view of the third bowl of the kit, according to some examples.

FIG. 19 illustrates a similar side view to that of FIGS. 10 and 15, according to some examples. To reiterate, the third bowl 100c of FIG. 19 may hold a specific type of food. FIG. 19 shows the third bowl 100c with a third exterior base portion 404c, a third wall 500c extending from the third exterior base portion 404c, and the third upper rim 504c at the top of the third wall 500c. This figure additionally shows the second indication 602c on the third upper rim 504c of the third bowl 100c and illustrates how the second indication 602c may be visible from the side.

Figure 20:
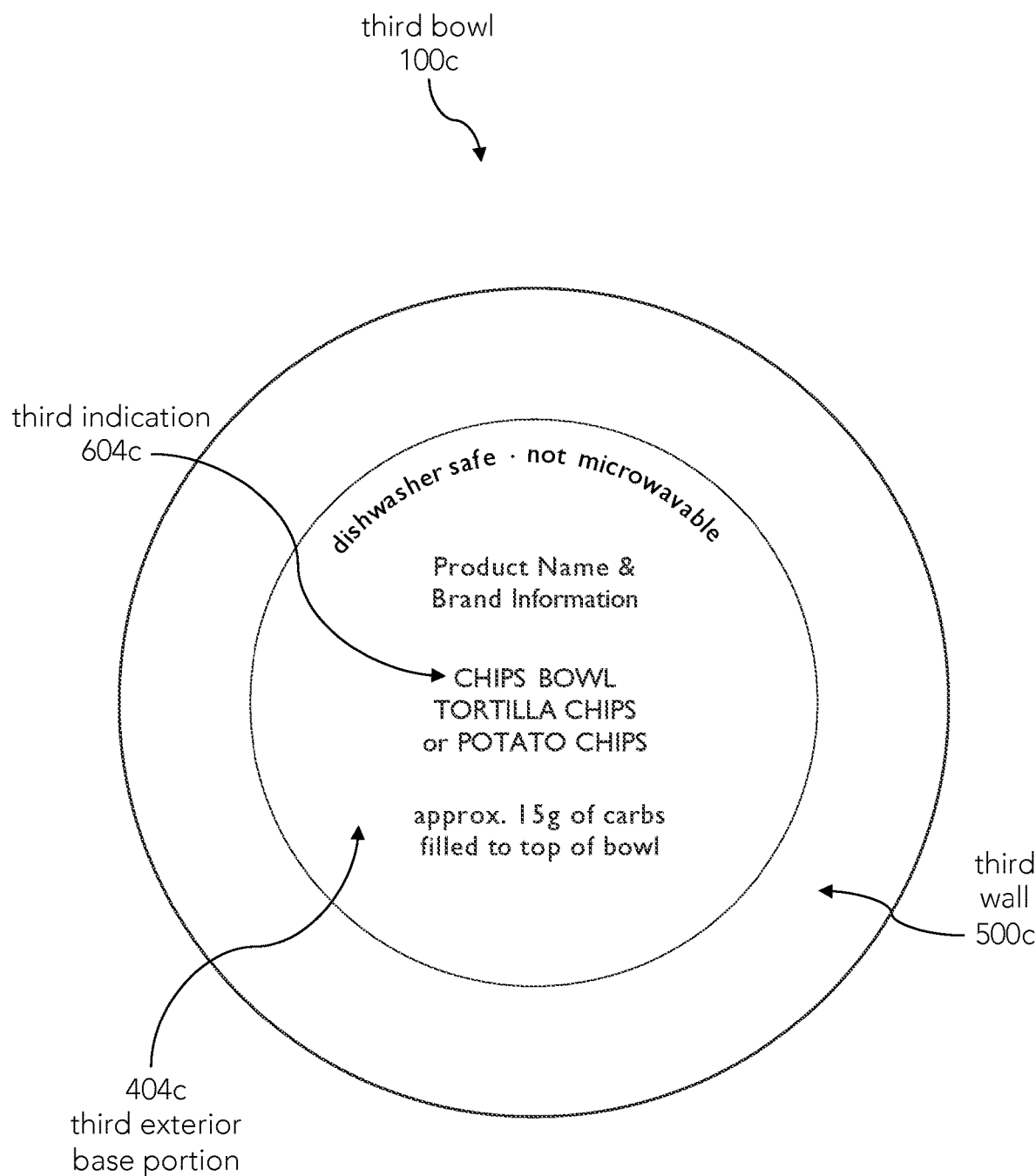
FIG. 20 illustrates a bottom view of the third bowl of the kit, according to some examples.

FIG. 20 illustrates a similar bottom view to that of FIGS. 11 and 16, according to some examples. To reiterate, FIG. 20 shows a view of the third bowl 100c that holds a specific type of food and is depicted as a bowl with the third wall 500c of the third bowl 100c extending from the third exterior base portion 404c. Also illustrated in this figure is the third indication 604c on the third exterior base portion 404c, which may provide a suggestion as to the identity of the third food type 200c the third bowl 100c is intended to contain. However, it is understood that the third indication 604c may also and/or alternatively provide other information (e.g., how to use the bowl, how not to use the bowl, what quantity of macronutrients of the third food type 200c the bowl is meant to measure, etc.) Additionally, FIG. 20 shows the third indication 604c to include a series of words. However, it is understood that the third indication 604c may contain any type of indication (e.g., a word, multiple words, an image, a color, a pattern, and the like).

Figure 21:
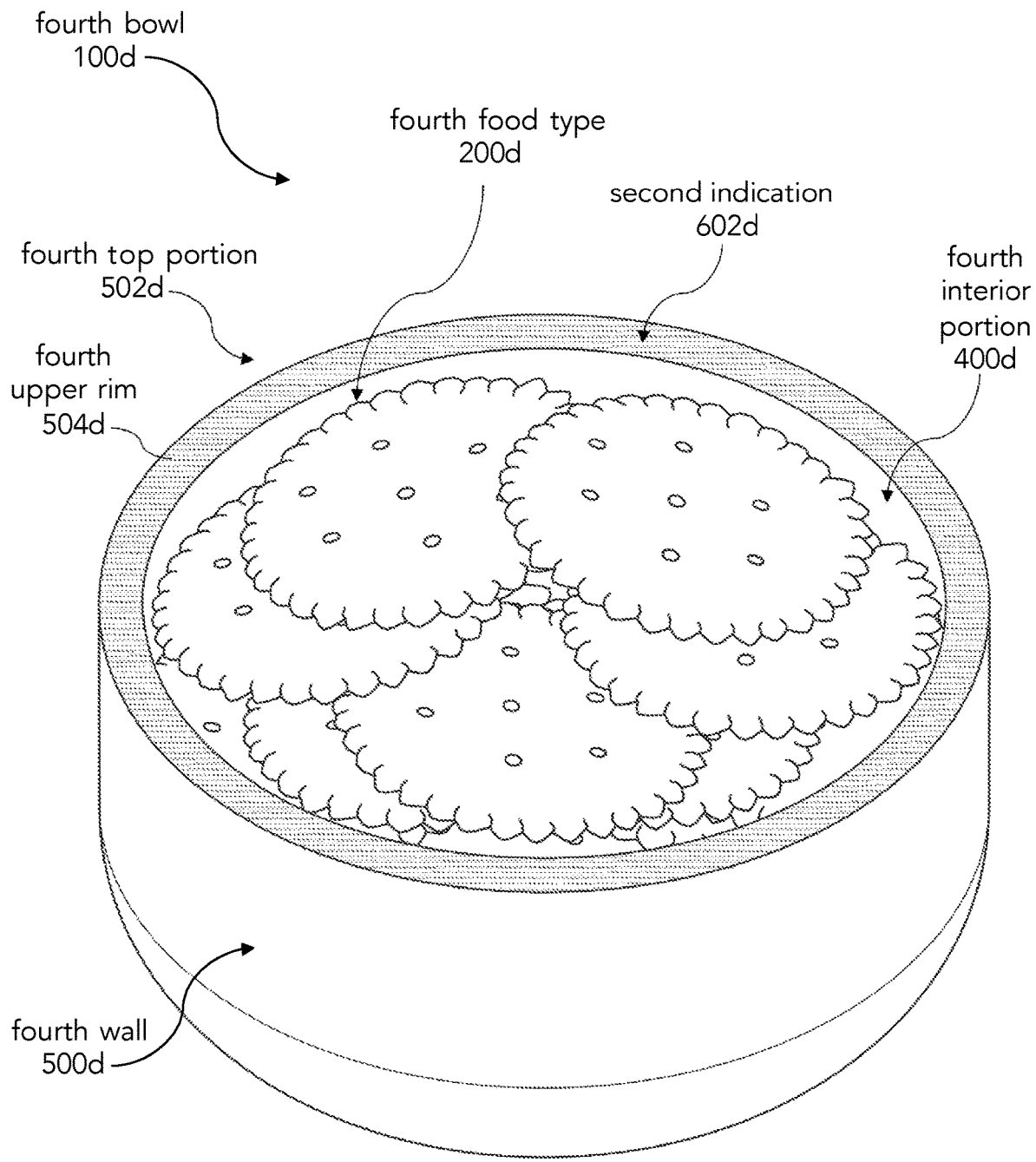
FIG. 21 illustrates a top perspective view of a fourth bowl of the kit holding crackers, according to some examples.

FIG. 21 illustrates a similar perspective view to that of FIGS. 8, 13, and 17, this time showing the fourth bowl 100d holding crackers, according to some examples. To reiterate and expand on some of the differences, FIG. 21 displays one example where the crackers are defined as a fourth food type 200d, although the fourth food type 200d may be any type of food the fourth bowl 100d is designed to hold. The example of the fourth bowl 100d in this figure is depicted with a fourth wall 500d and a fourth upper rim 504d, both of which may define a fourth top portion 502d of the fourth bowl 100d and may hold the crackers inside the fourth interior portion 400d of the fourth bowl 100d. While the fourth top portion 502d is depicted as being open, this is understood to not be a requirement as the fourth bowl 100d may include a cover or other item over the fourth bowl 100d so that the fourth top portion 502d is closed or semi-closed. FIG. 21 also illustrates the second indication 602d, which, as previously mentioned, may be any type of indication (e.g., a word, multiple words, an image, a color, a pattern, and the like).

Figure 22:
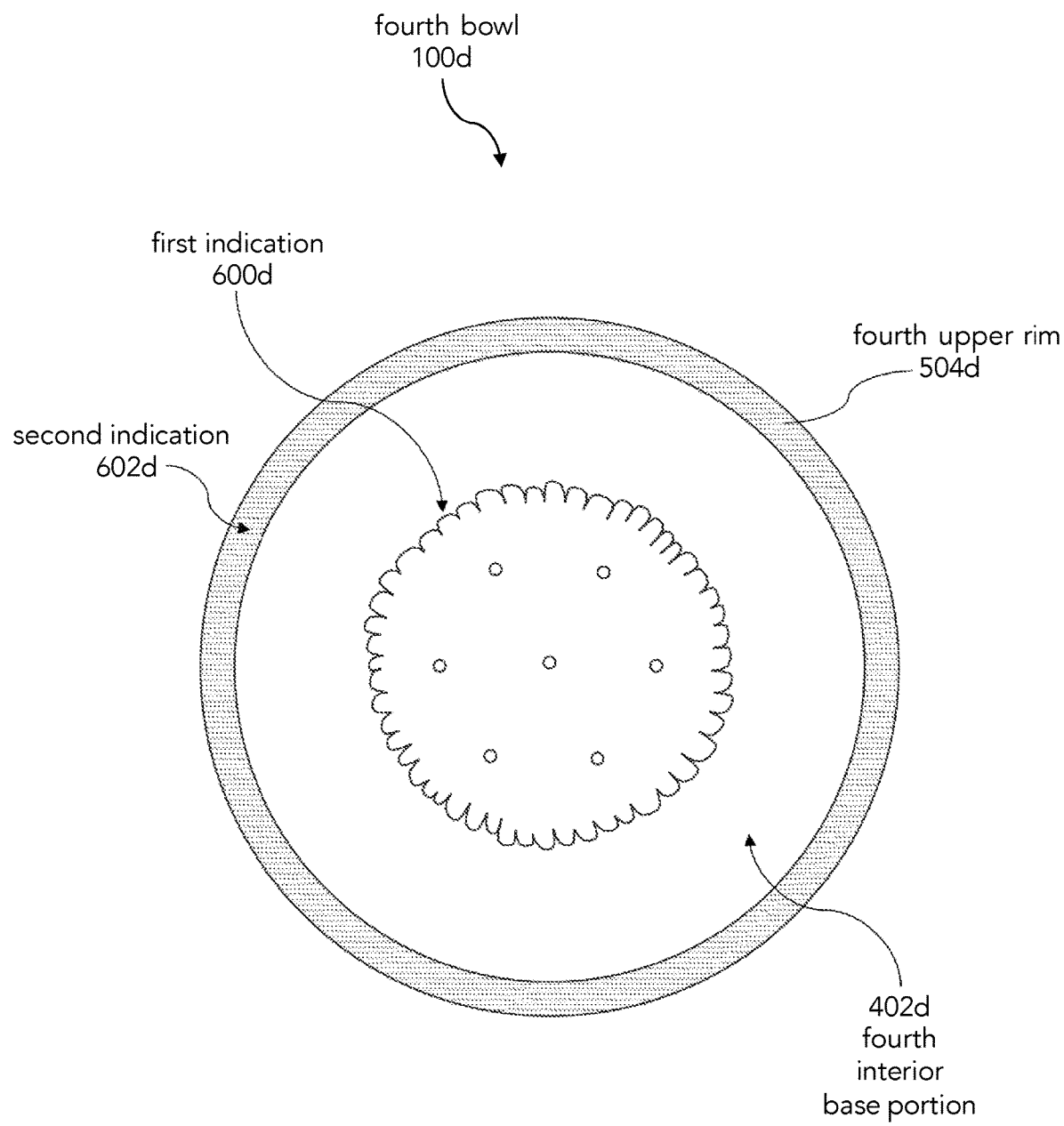
FIG. 22 illustrates a top view of the fourth bowl of the kit, according to some examples.

FIG. 22 illustrates a similar top view to that of FIGS. 9, 14, and 18, whereby the bowl does not contain any food, according to some examples. To reiterate, FIG. 22 illustrates a top view of the fourth bowl 100d that holds a specific type of food. This figure shows the fourth bowl 100d as a round bowl, although it is understood that the fourth bowl 100d may be other forms of instruments capable of containing an item such as food (e.g., containers, serving dishes, serving utensils, measuring cups, and the like) and may be different shapes. Other possible shapes include square, rectangular, oblong, and/or "novelty" shapes (i.e., star, holiday tree, pumpkin, heart, and the like). FIG. 22 also shows the first indication 600d as a visual representation of a cracker on the fourth interior base portion 402d, although this is not a requirement. Also illustrated in FIG. 22 is the fourth upper rim 504d with the second indication 602d. In some examples, the second indication 602a comprises a color, represented in FIG. 22 as a dashed striped pattern, corresponding to the fourth food type 200d. The first indication 600d and/or the second indication 602d may be any type of indication (e.g., a word, multiple words, an image, a color, a pattern, and the like).

Figure 23:
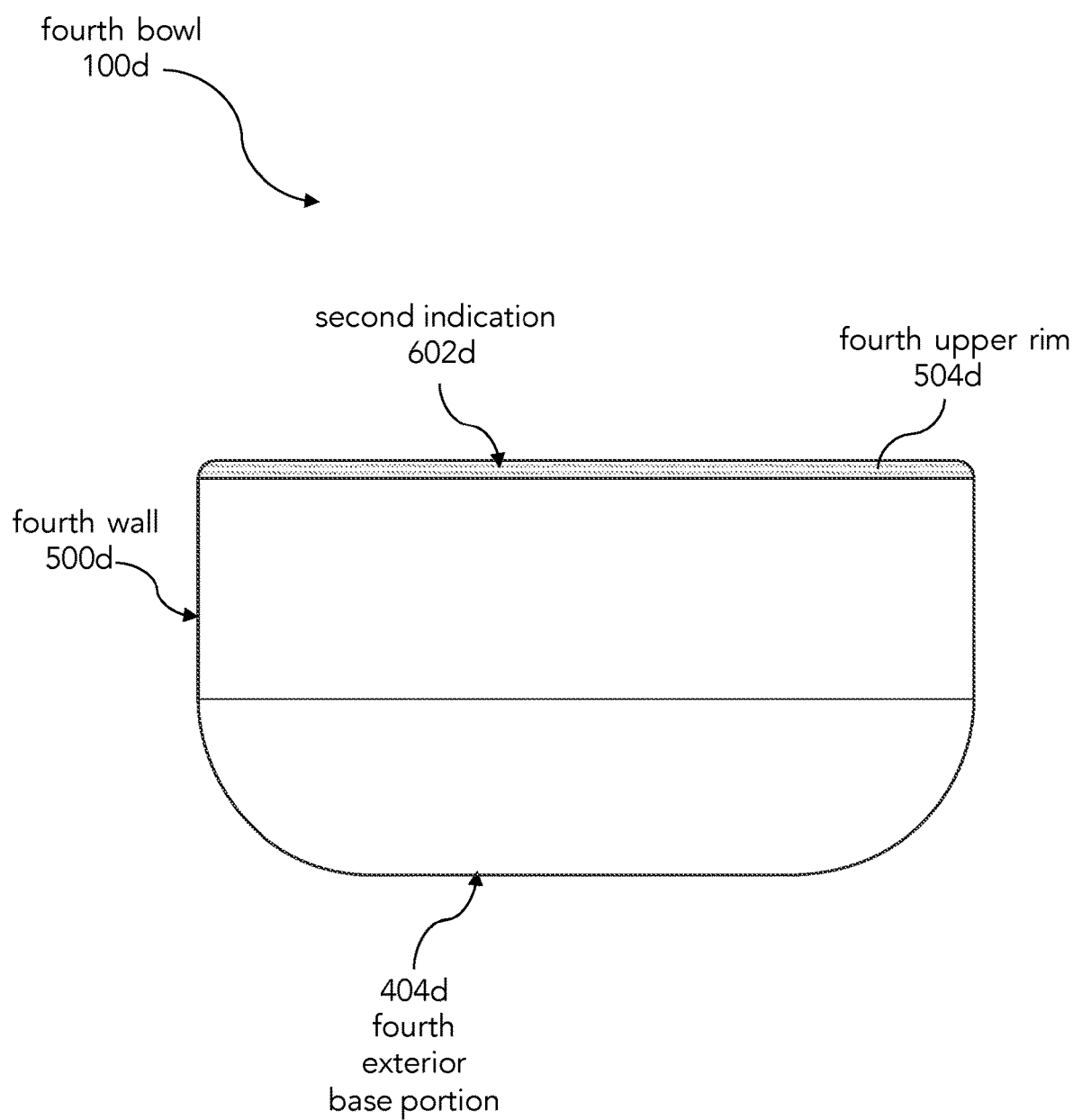
FIG. 23 illustrates a side view of the fourth bowl of the kit, according to some examples.

FIG. 23 illustrates a similar side view to that of FIGS. 10, 15, and 19, according to some examples. To reiterate, the fourth bowl 100d of FIG. 23 may hold a specific type of food. FIG. 23 shows the fourth bowl 100d with a fourth exterior base portion 404d, a fourth wall 500d extending from the fourth exterior base portion 404d, and the fourth upper rim 504d at the top of the fourth wall 500d. This figure additionally shows the second indication 602d on the fourth upper rim 504d of the fourth bowl 100d and illustrates how the second indication 602d may be visible from the side.

Figure 24:
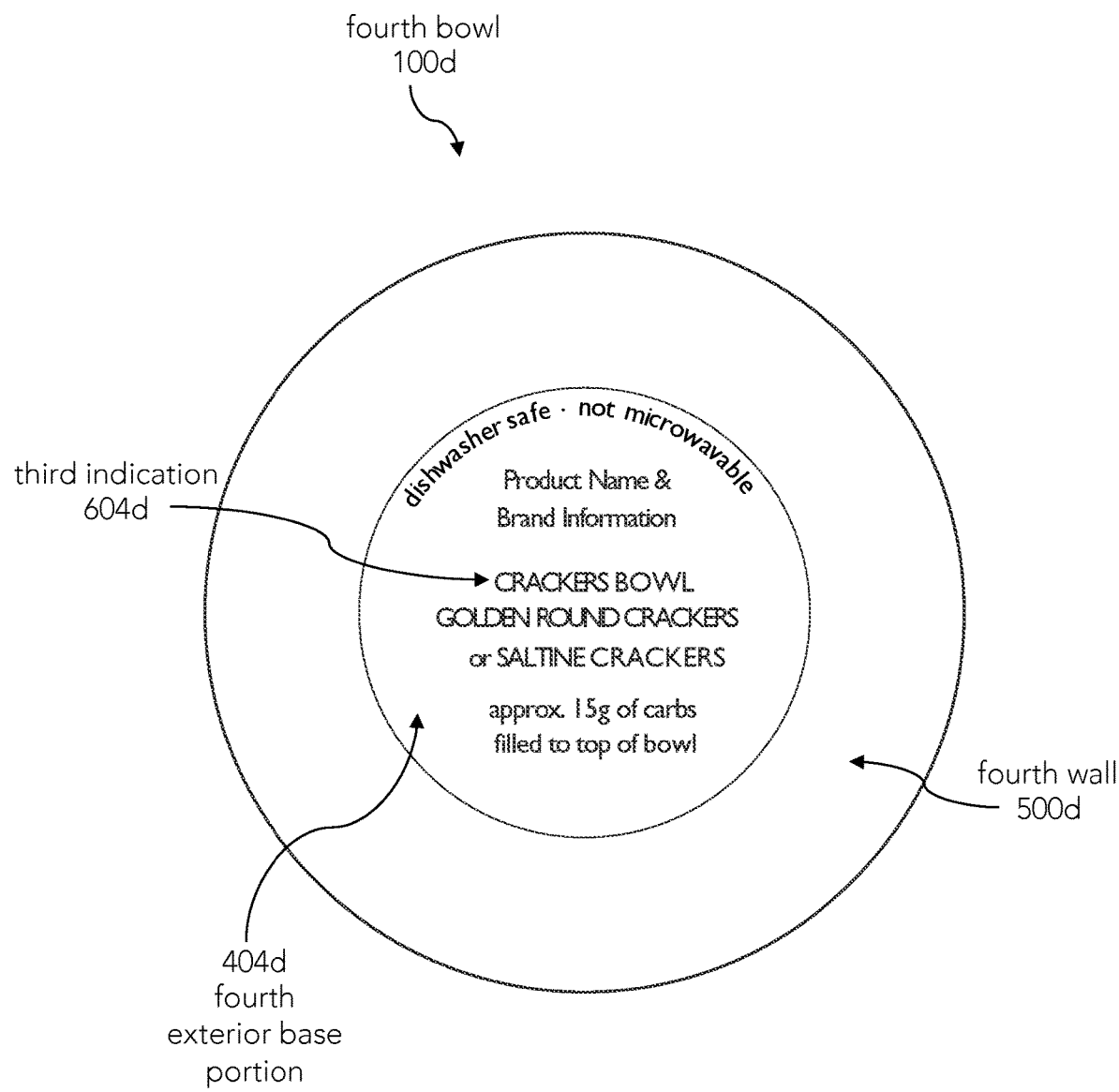
FIG. 24 illustrates a bottom view of the fourth bowl of the kit, according to some examples.

FIG. 24 illustrates a similar bottom view to that of FIGS. 11, 16, and 20, according to some examples. To reiterate, FIG. 24 shows a view of the fourth bowl 100d that holds a specific type of food and is depicted as a bowl with the fourth wall 500d of the fourth bowl 100d extending from the fourth exterior base portion 404d. Also illustrated in this figure is the third indication 604d on the fourth exterior base portion 404d, which may provide a suggestion as to the identity of the fourth food type 200d the fourth bowl 100d is intended to contain. However, it is understood that the third indication 604d may also and/or alternatively provide other information (e.g., how to use the bowl, how not to use the bowl, what quantity of macronutrients of the fourth food type 200d the bowl is meant to measure, and the like). Additionally, FIG. 24 shows the third indication 604d to include a series of words. However, it is understood that the third indication 604d may contain any type of indication (e.g., a word, multiple words, an image, a color, a pattern, and the like).

Figure 25:
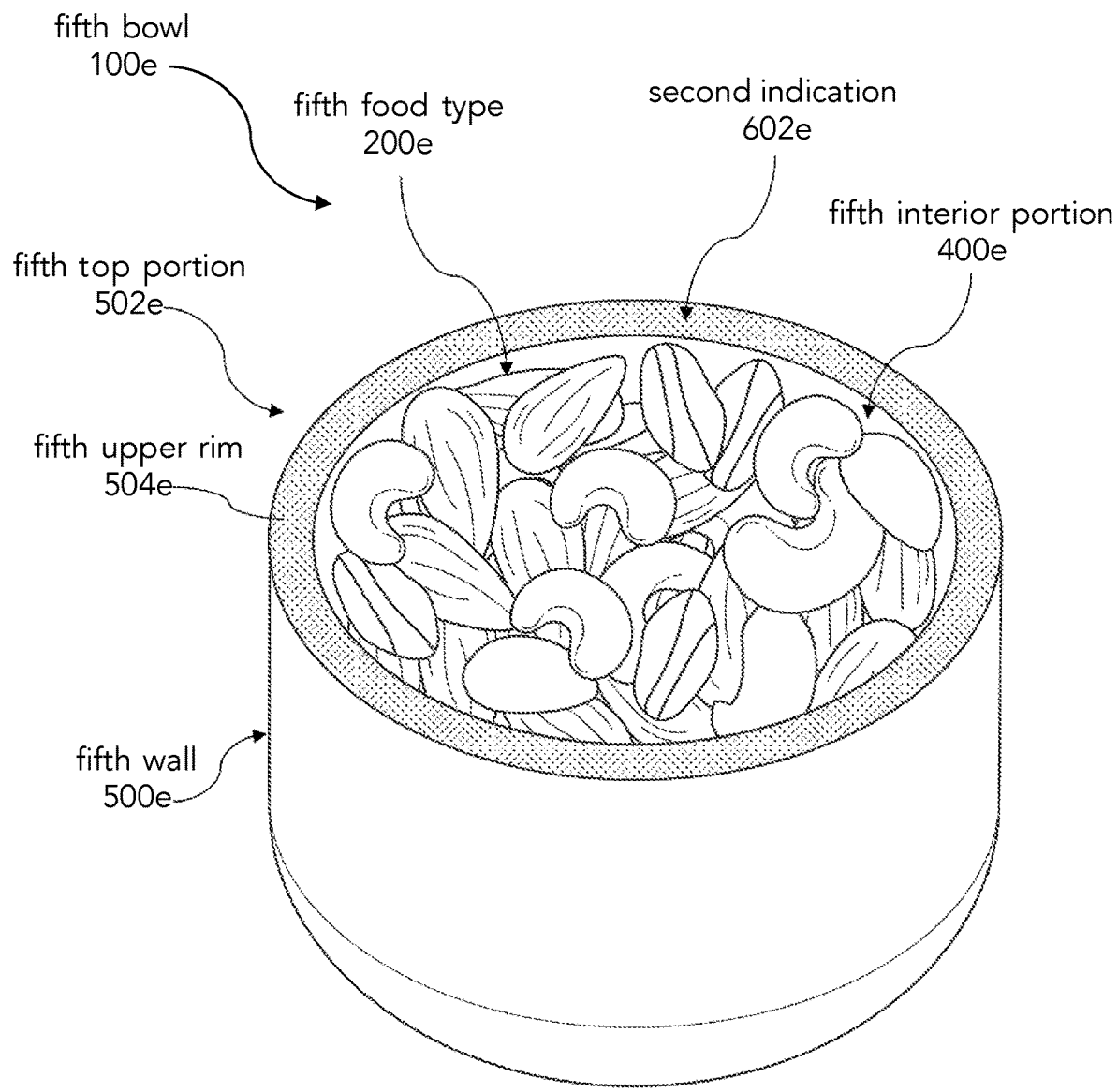
FIG. 25 illustrates a top perspective view of a fifth bowl of the kit holding nuts, according to some examples.

FIG. 25 illustrates a similar perspective view to that of FIGS. 8, 13, 17, and 21, this time showing the fifth bowl 100e holding nuts, according to some examples. To reiterate and expand on some of the differences, FIG. 25 displays one example where the nuts are defined as a fifth food type 200e, although the fifth food type 200e may be any type of food the fifth bowl 100e is designed to hold. The example of the fifth bowl 100e in this figure is depicted with a fifth wall 500e and a fifth upper rim 504e, both of which may define a fifth top portion 502e of the fifth bowl 100e and may hold the nuts inside the fifth interior portion 400e of the fifth bowl 100e. While the fifth top portion 502e is depicted as being open, this is understood to not be a requirement as the fifth bowl 100e may include a cover or other item over the fifth bowl 100e so that the fifth top portion 502e is closed or semi-closed. FIG. 25 also illustrates the second indication 602e, which, as previously mentioned, may be any type of indication (e.g., a word, multiple words, an image, a color, a pattern, and the like).

Figure 26:
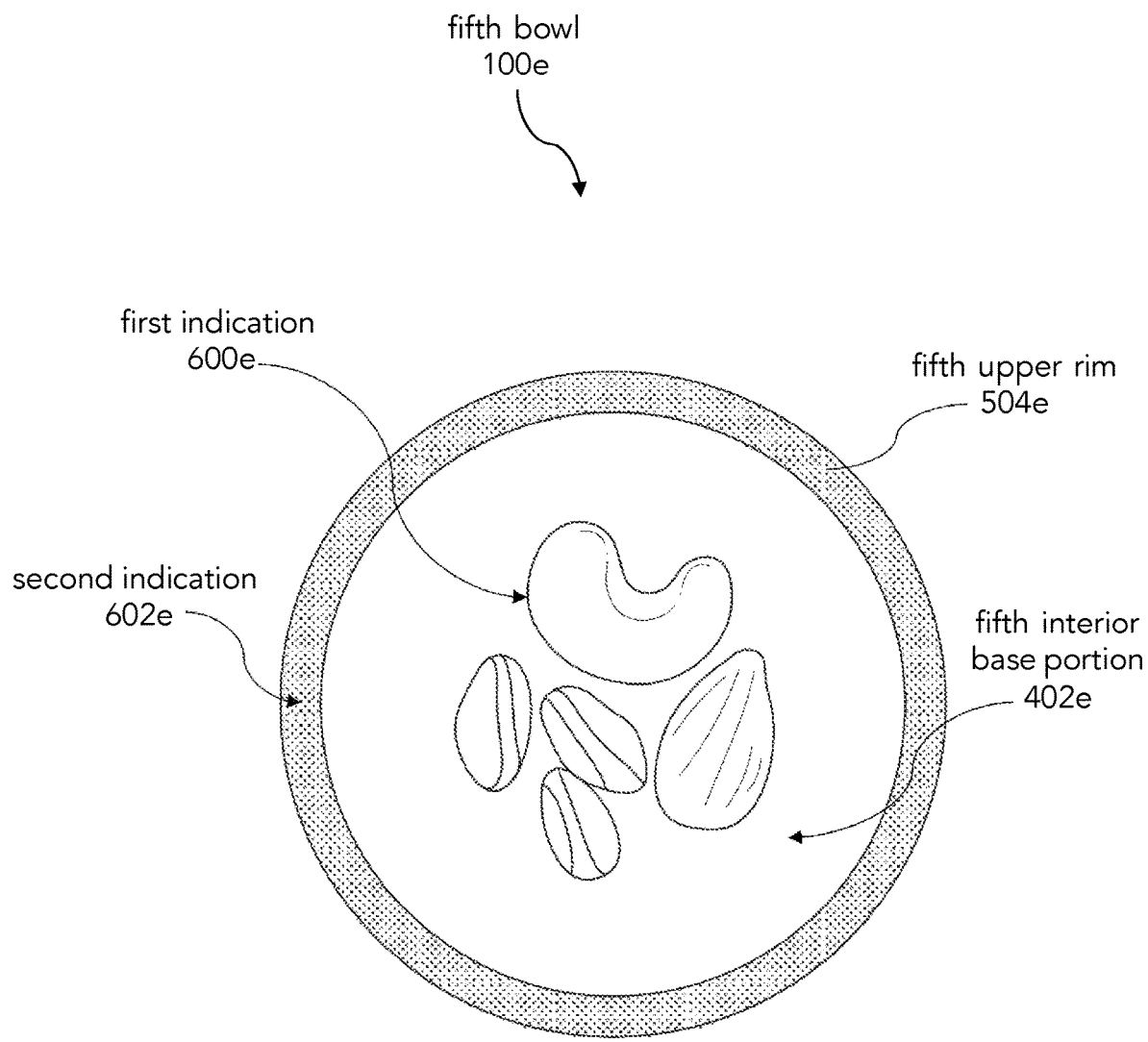
FIG. 26 illustrates a top view of the fifth bowl of the kit, according to some examples.

FIG. 26 illustrates a similar top view to that of FIGS. 9, 14, 18, and 22, whereby the bowl does not contain any food, according to some examples. To reiterate, FIG. 26 illustrates a top view of the fifth bowl 100e that holds a specific type of food. This figure shows the fifth bowl 100e as a round bowl, although it is understood that the fifth bowl 100e may be other forms of instruments capable of containing an item such as food (e.g., containers, serving dishes, serving utensils, measuring cups, and the like) and may be different shapes. Other possible shapes include square, rectangular, oblong, and/or "novelty" shapes (i.e., star, holiday tree, pumpkin, heart, and the like). FIG. 26 also shows the first indication 600e as a visual representation of a group of nuts on the fifth interior base portion 402e, although this is not a requirement. Also illustrated in FIG. 26 is the fifth upper rim 504e with the second indication 602e. In some examples, the second indication 602e comprises a color, represented in FIG. 26 as a dotted pattern, corresponding to the fifth food type 200e. The first indication 600e and/or the second indication 602e may be any type of indication (e.g., a word, multiple words, an image, a color, a pattern, and the like).

Figure 27:
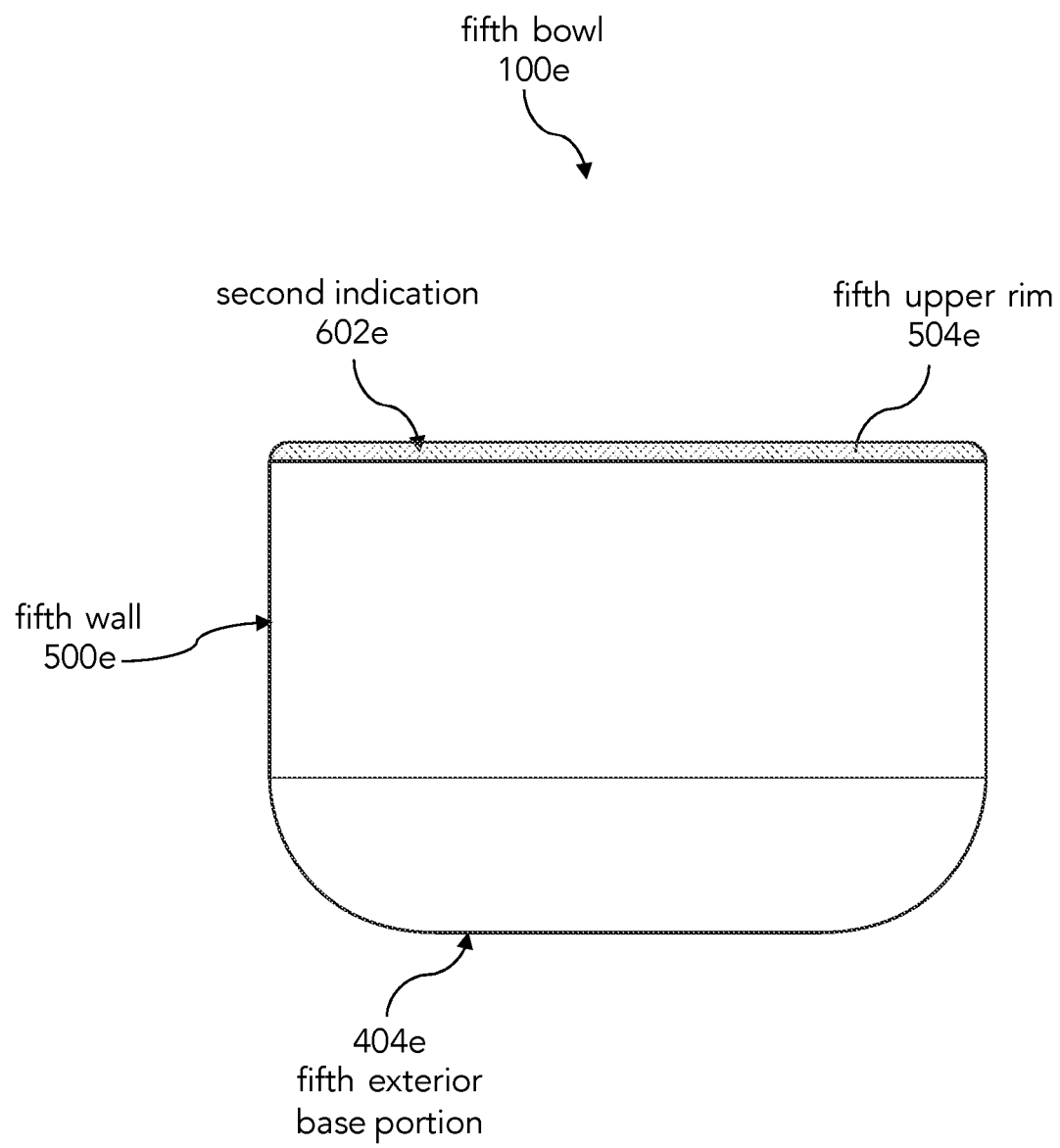
FIG. 27 illustrates a side view of the fifth bowl of the kit, according to some examples.

FIG. 27 illustrates a similar side view to that of FIGS. 10, 15, 19, and 23, according to some examples. To reiterate, the fifth bowl 100e of FIG. 27 may hold a specific type of food. FIG. 27 shows the fifth bowl 100e with a fifth exterior base portion 404e, a fifth wall 500e extending from the fifth exterior base portion 404e, and the fifth upper rim 504e at the top of the fifth wall 500e. This figure additionally shows the second indication 602e on the fifth upper rim 504e of the fifth bowl 100e and illustrates how the second indication 602a may be visible from the side.

Figure 28:
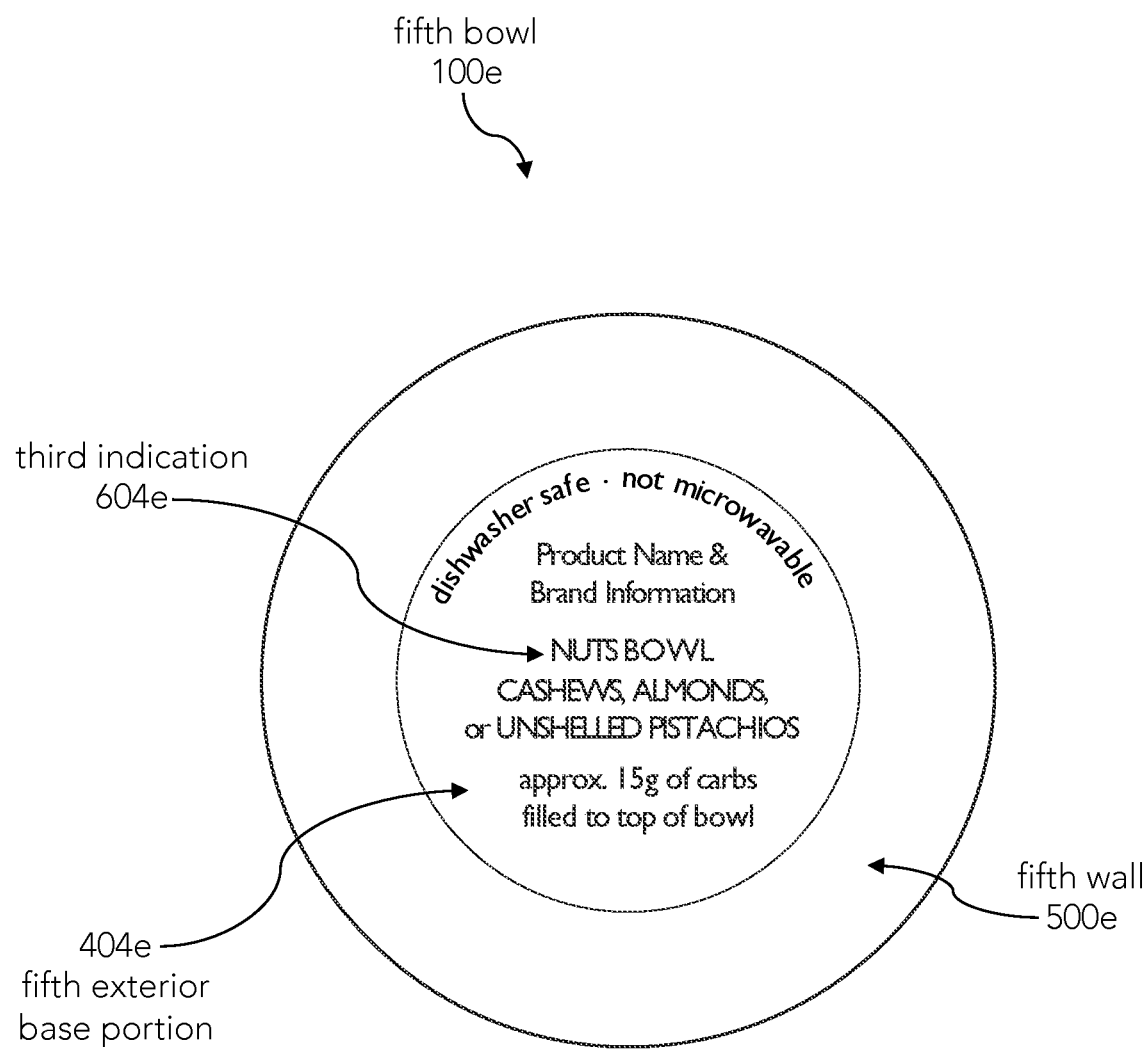
FIG. 28 illustrates a bottom view of the fifth bowl of the kit, according to some examples.

FIG. 28 illustrates a similar bottom view to that of FIGS. 11, 16, 20, and 24, according to some examples. To reiterate, FIG. 28 shows a view of the fifth bowl 100e that holds a specific type of food and is depicted as a bowl with the fifth wall 500e of the fifth bowl 100e extending from the fifth exterior base portion 404e. Also illustrated in this figure is the third indication 604e on the fifth exterior base portion 404e which may provide a suggestion as to the identity of the fifth food type 200e the fifth bowl 100e is intended to contain. However, it is understood that the third indication 604e may also and/or alternatively provide other information (e.g., how to use the bowl, how not to use the bowl, what quantity of macronutrients of the fifth food type 200e the bowl is meant to measure, etc.) Additionally, FIG. 28 shows the third indication 604e to include a series of words. However, it is understood that the third indication 604e may contain any type of indication (e.g., a word, multiple words, an image, a color, a pattern, and the like).

Figure 29:
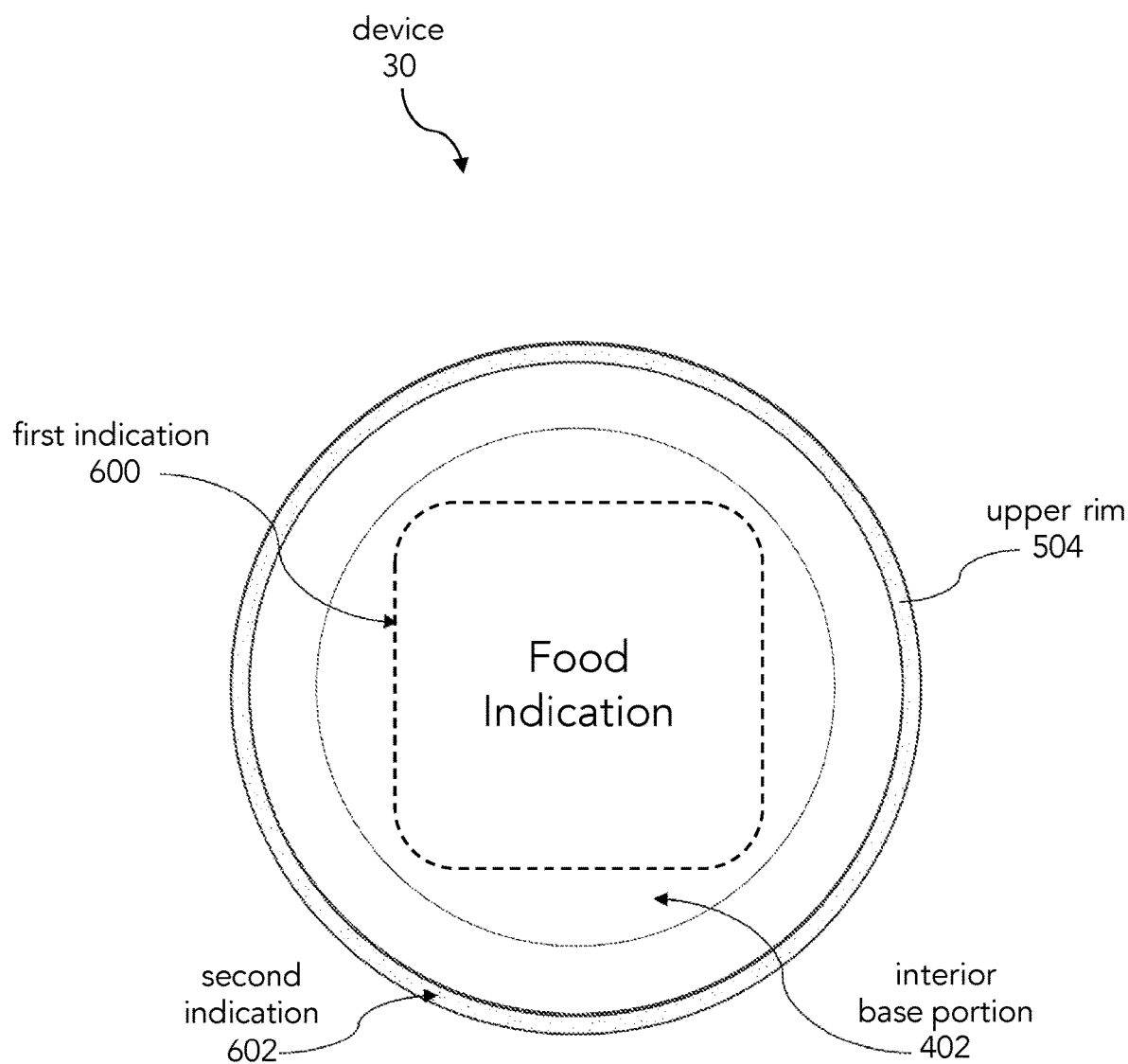
FIG. 29 illustrates a top view of a device, according to some examples.

FIG. 29 illustrates a top view of a device 30, whereby the device 30 does not contain any food, according to some examples. This figure shows one example of a general device that may be any of the previously mentioned bowls or another form of instrument capable of containing an item such as food (e.g., containers, serving dishes, serving utensils, measuring cups, and the like). FIG. 29 additionally shows a first indication 600 on the top of an interior base portion 402 of the device 30. The first indication 600 may be located on the interior base portion 402, although this is not a requirement. FIG. 29 also illustrates a second indication 602 on an upper rim 504 of the device 30. The upper rim 504 may include a portion and/or up to the entire top edge of the device 30. The second indication 602 may be located on the upper rim 504, although this is not a requirement. The first indication 600 and/or the second indication 602 may give an indication as to the identity of the food type 200 and may be in multiple locations on the device 30. The first indication 600 and the second indication 602 may be any type of indication (e.g., a word, multiple words, an image, a color, a pattern, and the like).

Figure 30:
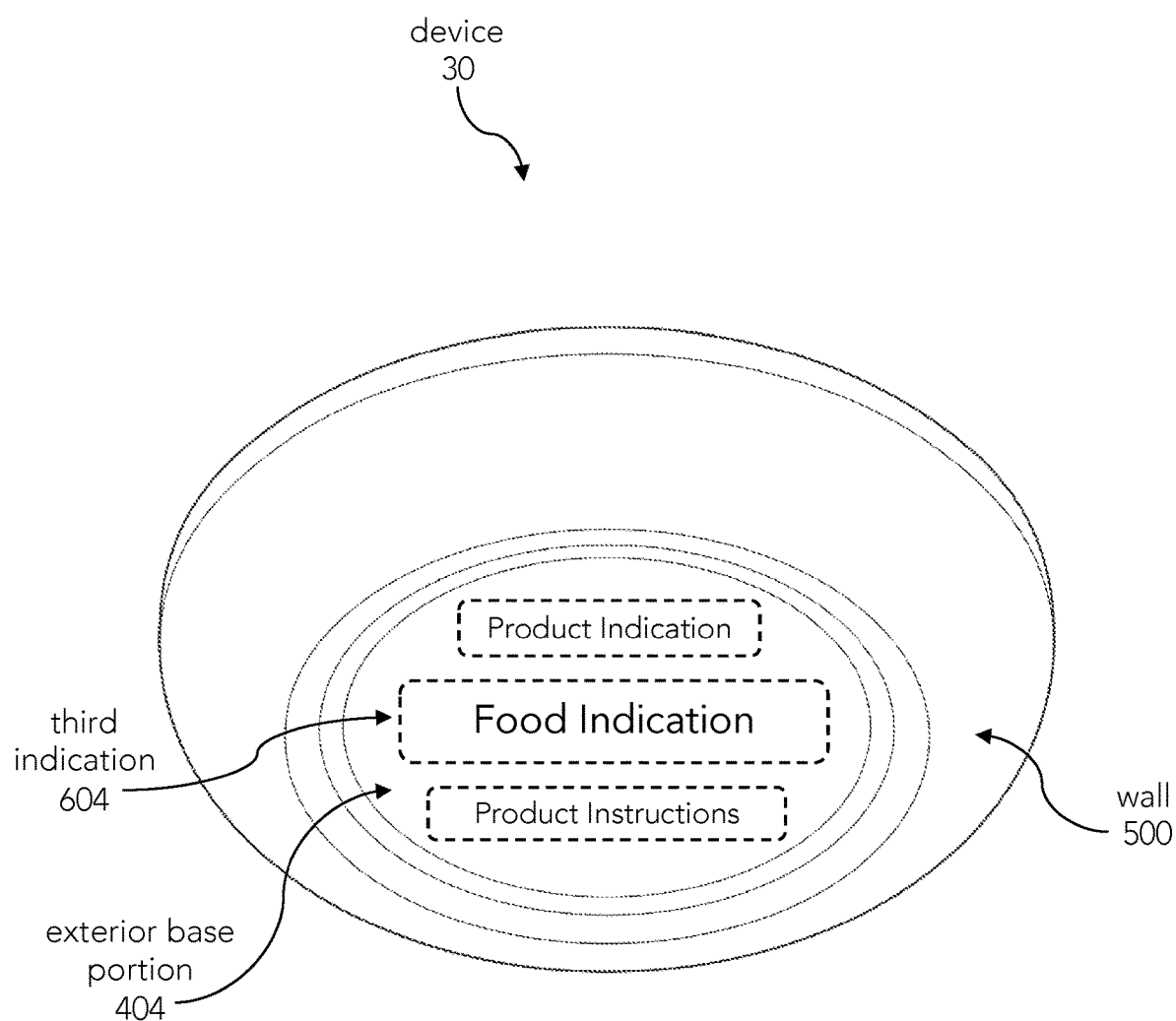
FIG. 30 illustrates a bottom perspective view of the device, according to some examples.

FIG. 30 illustrates a perspective bottom view of the device 30, according to some examples. Similar to FIG. 29, the device 30 in FIG. 30 is one example of a general device that may be any of the previously mentioned bowls or another form of instrument capable of containing an item such as food (e.g., containers, serving dishes, serving utensils, measuring cups, and the like). FIG. 30 also shows the device 30 with a wall 500 extending from the exterior base portion 404. The wall 500 may extend up to the upper rim 504, as shown in FIG. 29. Additionally, FIG. 30 illustrates a third indication 604 on the exterior base portion 404, although this is not a requirement. The third indication 604 may give an indication as to the identity of the food type 200 and may be in multiple locations on the bowl 100. The third indication 604 may be any type of indication (e.g., a word, multiple words, an image, a color, a pattern, and the like). In addition, the third indication 604 may include an indication of the product, an indication of how to use or not use the product, and/or other details, such as brand or manufacturing information.

Figure 31:
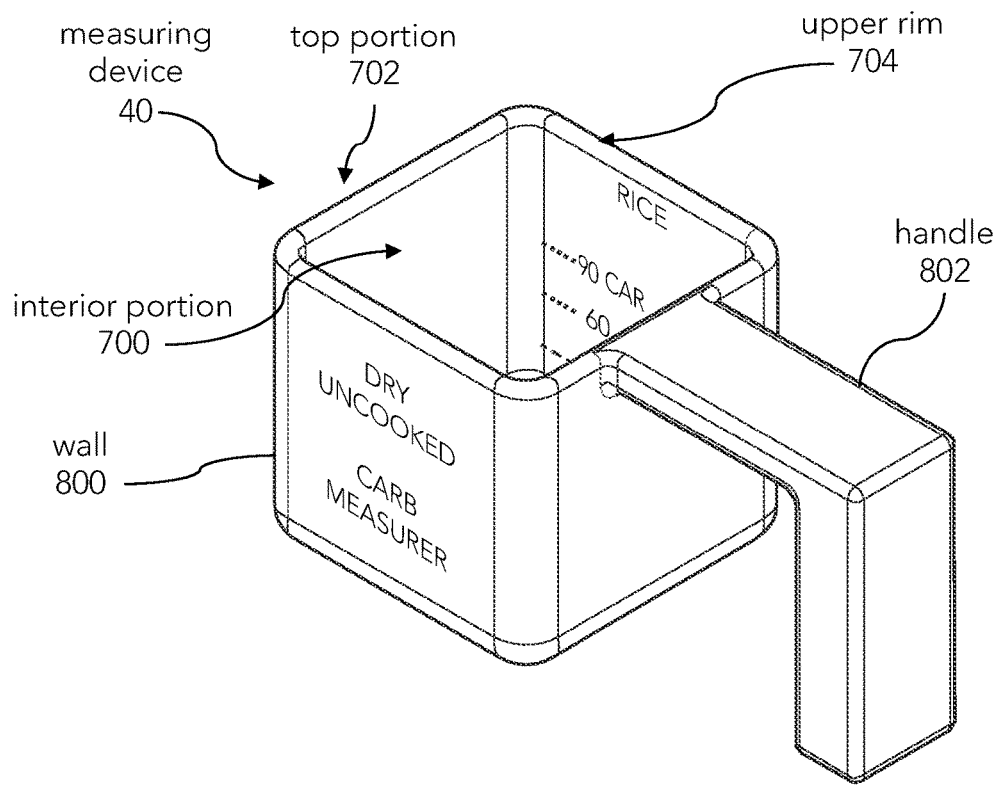
FIGS. 31 and 32 illustrate perspective views of a measuring device, according to some examples.
Figure 32:
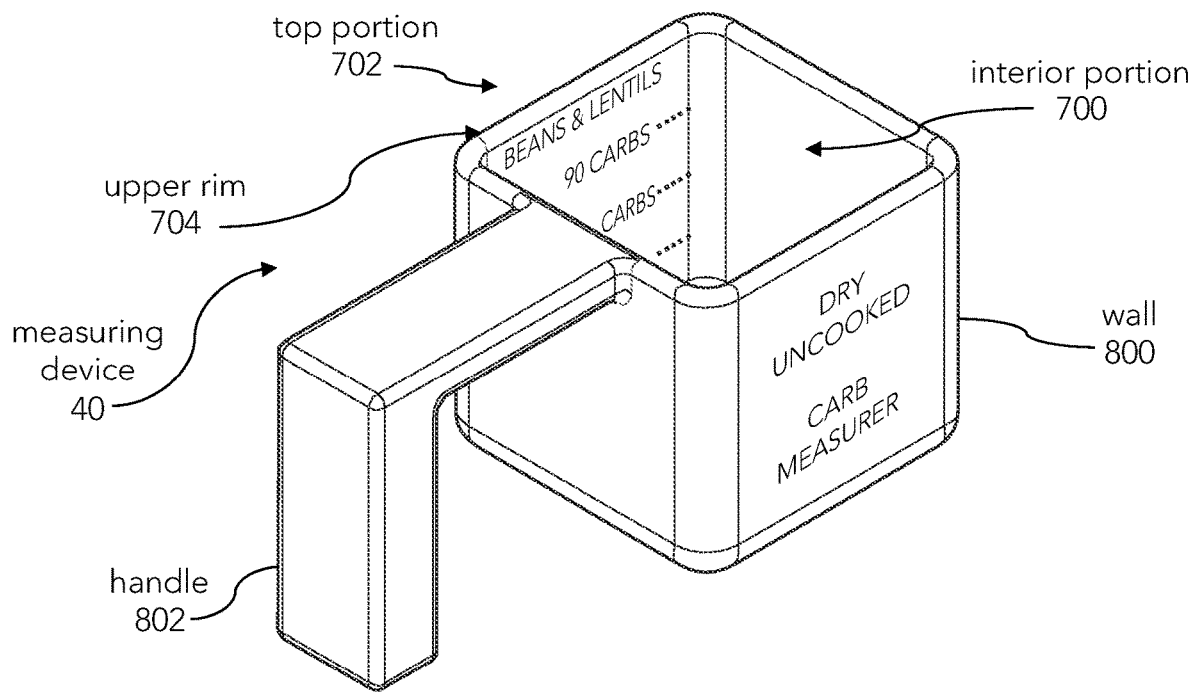

FIGS. 31 and 32 illustrate perspective views of a measuring device 40, whereby the measuring device 40 does not contain any food. Similar to the device 30 and the kit 20 of bowls described in this disclosure, the measuring device 40 may be sized to correspond to a predetermined macronutrient quantity of a specific food type. In some examples, as shown in FIGS. 31 and 32, the measuring device 40 is configured to measure specific amounts of carbohydrates of dry and uncooked rice, beans, and lentils. The measuring device 40 may be configured to measure other macronutrients and/or other types of food.

FIGS. 31 and 32 show some features of the measuring device 40. In some examples, the measuring device 40 includes an interior portion 700, configured to hold the food to be measured, surrounded by at least one wall 800. Because the measuring scoop 40 is illustrated as defining a rectangular shape, the measuring scoop 40 may include four walls 800. In some examples, the measuring device 40 defines a circular shape with one continuous wall 800. The measuring device 40 may also include a handle 802 coupled to at least one wall 800 adjacent to a top portion 702 of the measuring device 40. The top portion 702 may define an open top, as shown, or may include a lid configured to temporarily or permanently cover at least a portion of the top portion 702. In some examples, the measuring device 40 also includes an upper rim 704 surrounding the top portion 702. The upper rim 704 may include a spout to allow a user to easily pour out the contents of the measuring device 40.

Figure 33:
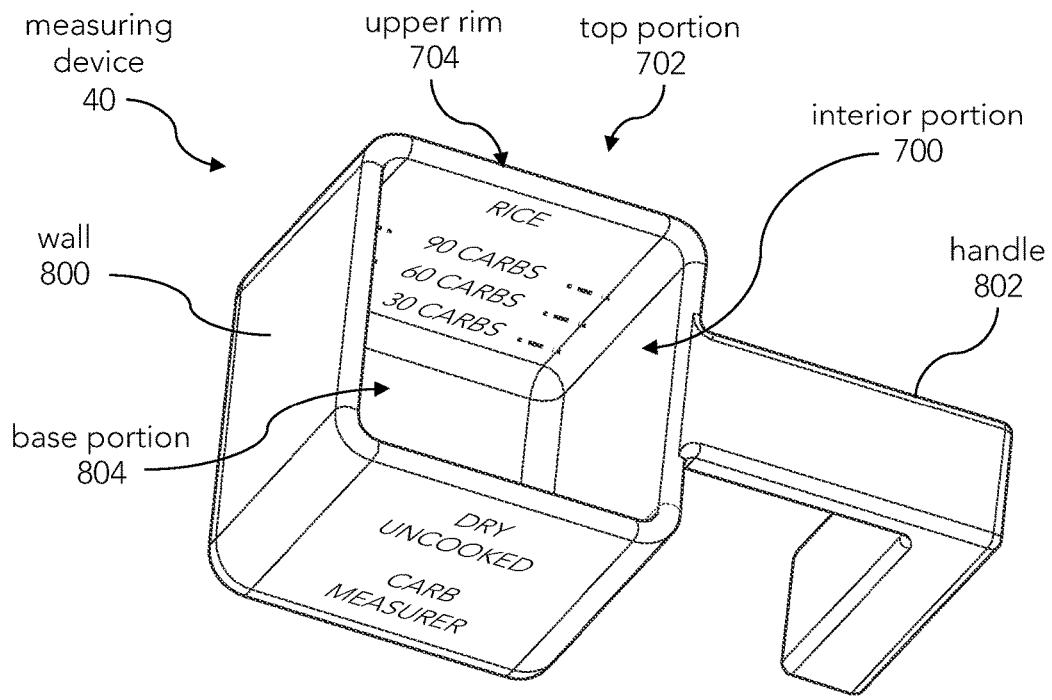
FIGS. 33 and 34 illustrate perspective views of the measuring device, according to some examples.
Figure 34:
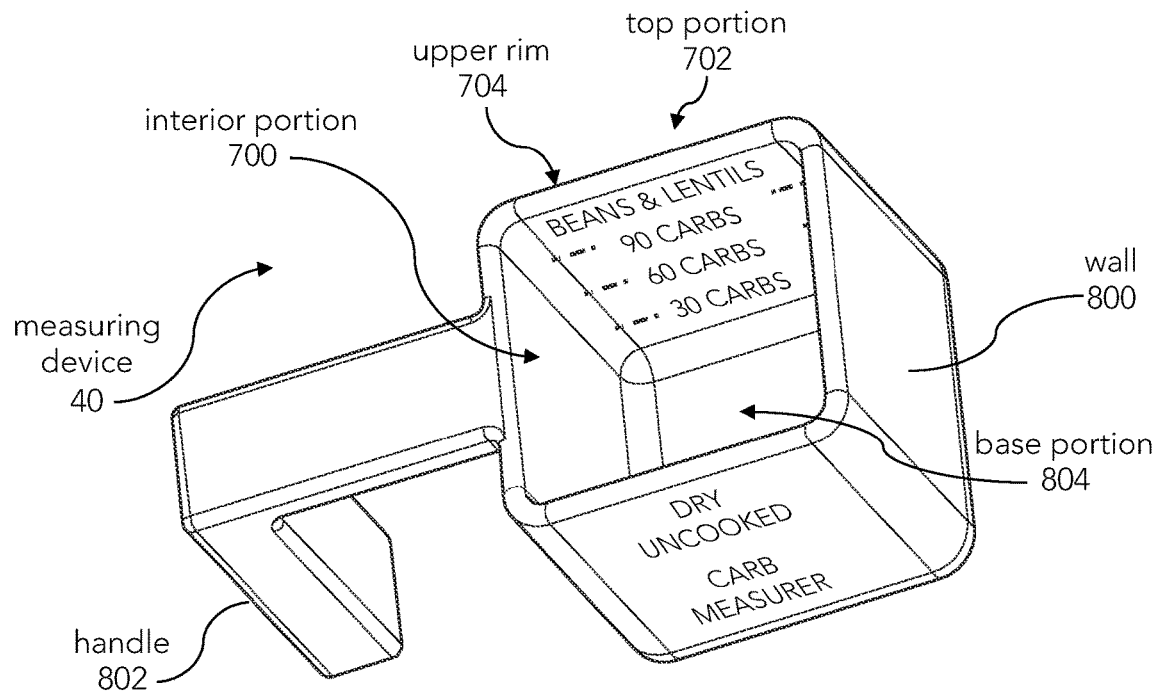

Similar to FIGS. 31 and 32, FIGS. 33 and 34 also show perspective views of the measuring device 40, whereby the measuring device 40 does not contain any food, but illustrate the interior portion 700 with greater detail, including the base portion 804. As previously mentioned, in some examples, the measuring device 40 is configured to measure specific amounts of carbohydrates of dry and uncooked rice. FIG. 33 shows that the specific measurements are 30 grams, 60 grams, and 90 grams, depending on the indication line on the interior of the wall 800. Similarly, FIG. 34 demonstrates that the measuring device 40 may also be configured to measure 30 grams, 60 grams, and 90 grams of carbs for beans and/or lentils, depending on the indication line. The quantities of 30, 60, and 90 grams of carbohydrates may be appropriate meal-sized portions, as compared to the snack portion of 15 grams of carbohydrates provided by the kit 20 of bowls previously described in this disclosure.

It should be noted that in some examples, the wall 800 showing the measurements for rice is located opposite the wall 800 showing the measurements for beans and/or lentils. This configuration is not a requirement, and the indications for each food type may be located on adjacent walls rather than opposite walls, or even on the same wall, possibly in different colors to make it easier for a user to measure their desired amount of each food.

Figure 35:
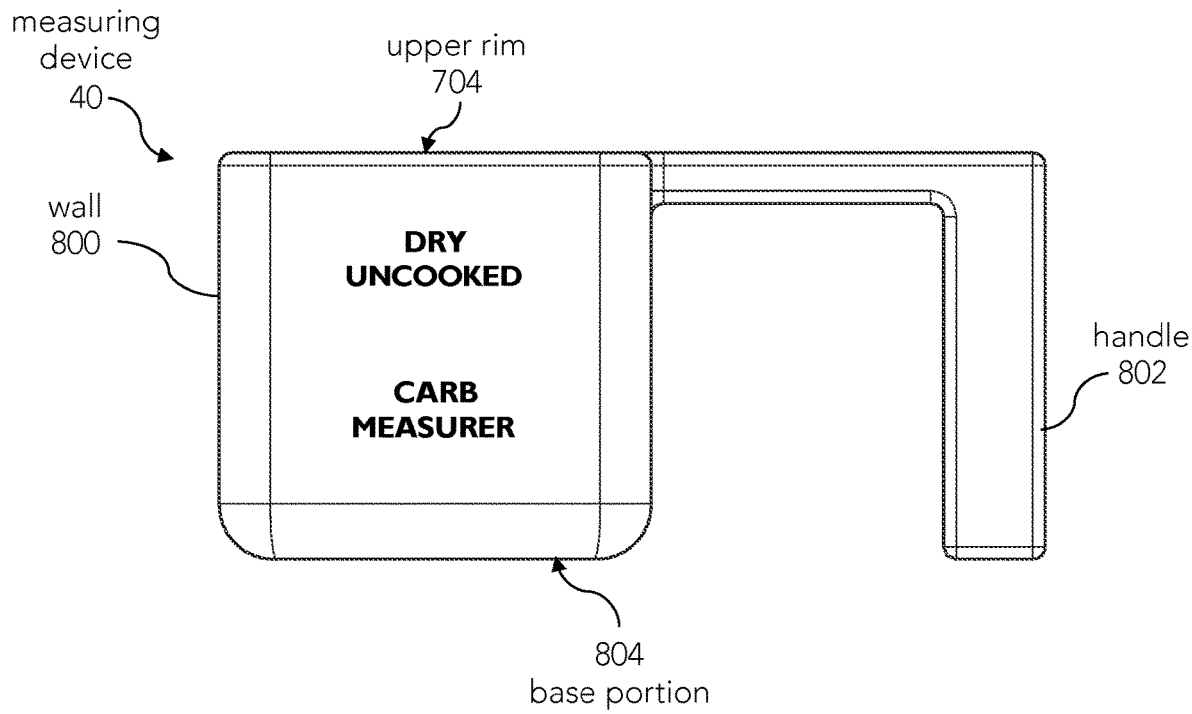
FIGS. 35 and 36 illustrate side views of the measuring device, according to some examples.
Figure 36:
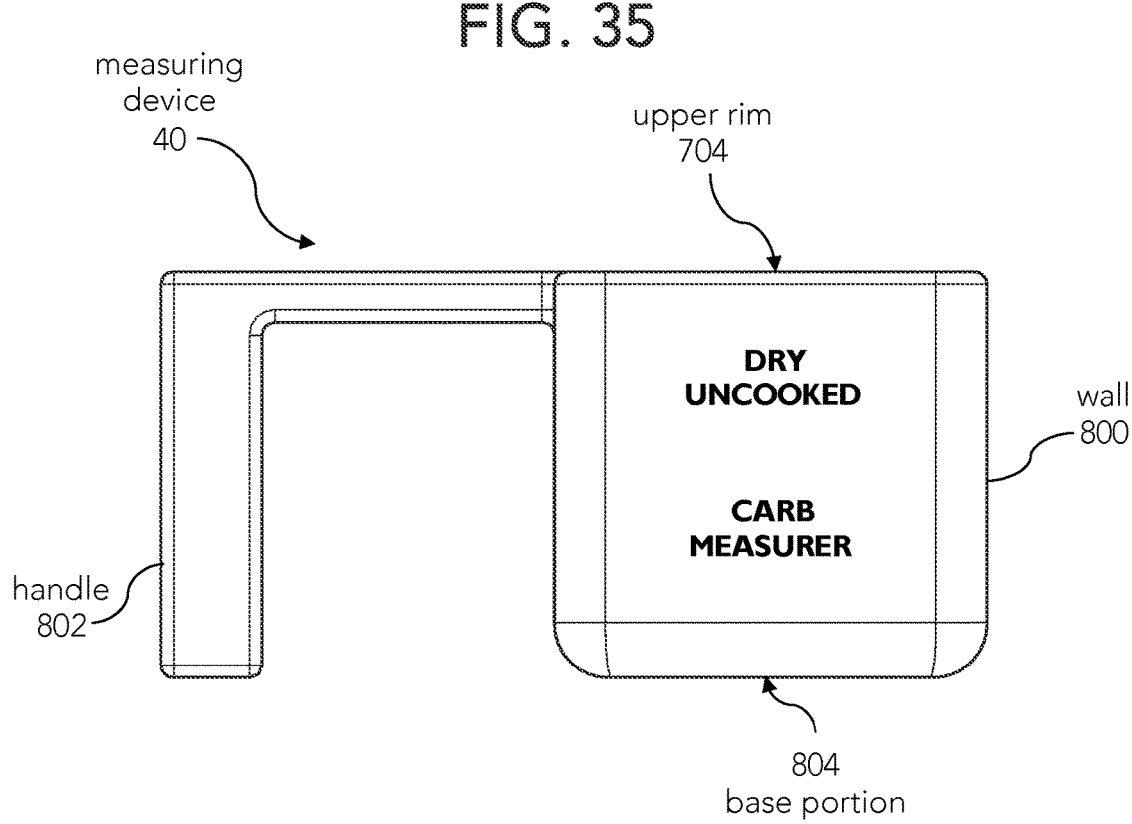

FIGS. 35 and 36 show opposite side views of the measuring device 40. As previously mentioned, the measuring device 40 may include at least one wall 800, a handle 802, a base portion 804, and an upper rim 704 located opposite the base portion 804. In some examples, as illustrated in FIGS. 31-36, the measuring device 40 includes the words "DRY UNCOOKED CARB MEASURER" on an exterior portion of at least one wall 800. In addition to, or instead of, these specific words, the measuring device 40 may include other information including, but not limited to, care instructions for the measuring device 40, brand and/or manufacturing information, color(s), image(s), other designs, list(s) of food type(s) that can be measured with the measuring device 40, and the like.

In some examples, the measuring device 40 is configured to measure wet and/or cooked foods rather than dry and uncooked foods (e.g., rinsed and uncooked rice rather than dry rice, cooked rice rather than dry rice, and the like). The measuring device 40 may also define a different form factor than the square scoop shown in FIGS. 31-36. In some examples, the measuring device 40 comprises a large spoon, a ladle, or a similar utensil. The measuring device 40 may include slots to drain liquid from cooked food. The measuring device 40 may comprise a plurality of spoons (or other utensils) sized to correspond to a predetermined macronutrient quantity of specific foods, similar to the kit 20 of bowls previously described in this disclosure. Also similar to the kit 20, each spoon may include at least one indication (e.g., a color, image, text, or the like) to indicate which specific food corresponds to each spoon.

Some of the components listed herein use the same number from figure to figure. It should be appreciated these components use the same numbers solely for ease of reference and to facilitate comprehension for the reader. While these components may use the same numbers, differences may be present in these components as illustrated in the various figures in which they appear and as described in the specification herein.

None of the steps described herein is essential or indispensable. Any of the steps can be adjusted or modified. Other or additional steps can be used. Any portion of any of the steps, processes, structures, and/or devices disclosed or illustrated in one embodiment, flowchart, or example in this specification can be combined or used with or instead of any other portion of any of the steps, processes, structures, and/or devices disclosed or illustrated in a different embodiment, flowchart, or example. The embodiments and examples provided herein are not intended to be discrete and separate from each other.

The section headings and subheadings provided herein are nonlimiting. The section headings and subheadings do not represent or limit the full scope of the examples described in the sections to which the headings and subheadings pertain. For example, a section titled "Topic 1" may include examples that do not pertain to Topic 1 and examples described in other sections may apply to and be combined with examples described within the "Topic 1" section.

The various features and processes described above may be used independently of one another, or may be combined in various ways. All possible combinations and subcombinations are intended to fall within the scope of this disclosure. In addition, certain method, event, state, or process blocks may be omitted in some implementations. The methods, steps, and processes described herein are also not limited to any particular sequence, and the blocks, steps, or states relating thereto can be performed in other sequences that are appropriate. For example, described tasks or events may be performed in an order other than the order specifically disclosed. Multiple steps may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements and/or steps. Thus, such conditional language is not generally intended to imply that features, elements, and/or steps are in any way required for one or more examples or that one or more examples necessarily include logic for deciding, with or without author input or prompting, whether these features, elements and/or steps are included or are to be performed in any particular example. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain examples require at least one of X, at least one of Y, and at least one of Z to each be present.

The term "and/or" means that "and" applies to some examples and "or" applies to some examples. Thus, A, B, and/or C can be replaced with A, B, and C written in one sentence and A, B, or C written in another sentence. A, B, and/or C means that some examples can include A and B, some examples can include A and C, some examples can include B and C, some examples can only include A, some examples can include only B, some examples can include only C, and some examples can include A, B, and C. The term "and/or" is used to avoid unnecessary redundancy.

The term "about" is used to mean "approximately." For example, the disclosure includes "In one example . . . the first bowl 100a, is filled with a single layer of blueberries along the bottom of the bowl, the volume of which corresponds to about 15 grams of carbohydrates." In this context "about 15 grams" is used to mean "approximately" 15 grams. Anywhere from 13-17 grams of carbohydrates is understood to fall within the acceptable range of "about" 15 grams.

The term "substantially" is used to mean "completely" or "nearly completely." For example, the disclosure includes "Each of the volumes of different food types may contain substantially the same quantity of a certain macronutrient." In this context, "substantially the same quantity" is used to mean that each of the volumes of different food types may contain completely or nearly completely the same quantity of a certain macronutrient. For example, a volume of food type A may contain 15 grams of carbohydrates and a volume of food type B may contain 14, 15, or 16 grams of carbohydrates but still be understood as containing "substantially the same quantity" of carbohydrates as food type A.

The term "adjacent" is used to mean "next to" or "adjoining." For example, the disclosure includes "A second indication of the food type may be located on an upper rim of the wall adjacent the open top portion." In this context, "adjacent the open top portion" is used to mean that the upper rim of the wall may be next to or adjoining the open top portion (of the bowl, device, measuring device, etc.).

While certain example examples have been described, these examples have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein.

I claim:

1. A device, comprising:
   a base portion having a first indication of a food type located on the base portion;
   a wall protruding from the base portion and surrounding the base portion;
   an open top portion located opposite the base portion; and
   a second indication of the food type located on an upper rim of the wall adjacent the open top portion,
   wherein the device defines a volume corresponding to a predetermined macronutrient quantity for the food type, the predetermined macronutrient quantity comprising a predetermined volume of the food type corresponding to 15 grams of carbohydrates.

2. The device of claim 1, wherein the base portion defines an interior base portion and the first indication of the food type is located on the interior base portion, the device further comprising an exterior base portion located opposite the interior base portion.

3. The device of claim 2, further comprising a third indication of the food type located on the exterior base portion, wherein the third indication of the food type comprises an indication selected from the group consisting of a product indication, a food indication, product instructions, and combinations thereof.

4. The device of claim 1, wherein the first indication of the food type comprises an indication selected from the group consisting of a visual representation of the food type, a word identifying the food type, and combinations thereof.

5. The device of claim 1, wherein the second indication of the food type comprises a color.

6. A kit, comprising:
   a first bowl including a base portion and a wall protruding from and surrounding the base portion of the first bowl, the wall of the first bowl configured to define an open top portion located opposite the base portion, wherein the first bowl defines a first volume corresponding to a predetermined macronutrient quantity of a first food type;
   a second bowl including a base portion and a wall protruding from and surrounding the base portion of the second bowl, the wall of the second bowl configured to define an open top portion located opposite the base portion, wherein the second bowl defines a second volume corresponding to a predetermined macronutrient quantity of a second food type;
   a third bowl including a base portion and a wall protruding from and surrounding the base portion of the third bowl, the wall of the third bowl configured to define an open top portion located opposite the base portion, wherein the third bowl defines a third volume corresponding to a predetermined macronutrient quantity of carbohydrates of a third food type;
   an indication of the third food type located on the base portion of the third bowl, wherein the indication of the third food type comprises an indication selected from the group consisting of a visual representation of the third food type, a word identifying the third food type, and combinations thereof; and
   a second indication of the third food type located on an upper rim of the wall of the third bowl, wherein the second indication of the third food type comprises a third color,
   wherein the first volume corresponding to the predetermined macronutrient quantity of the first food type is different from the second volume corresponding to the predetermined macronutrient quantity of the second food type.

7. The kit of claim 6,
   wherein the predetermined macronutrient quantity of the first food type comprises a predetermined volume of the first food type corresponding to 15 grams of carbohydrates, and
   wherein the predetermined macronutrient quantity of the second food type comprises a predetermined volume of the second food type corresponding to 15 grams of carbohydrates.

8. The kit of claim 6, further comprising:
   an indication of the first food type located on the base portion of the first bowl; and
   an indication of the second food type located on the base portion of the second bowl,
   wherein the indication of the first food type comprises an indication selected from the group consisting of a visual representation of the first food type, a word identifying the first food type, and combinations thereof, and
   wherein the indication of the second food type comprises an indication selected from the group consisting of a visual representation of the second food type, a word identifying the second food type, and combinations thereof.

9. The kit of claim 8, further comprising a second indication of the first food type located on an upper rim of the wall of the first bowl; and
   a second indication of the second food type located on an upper rim of the wall of the second bowl.

10. The kit of claim 9, wherein the second indication of the first food type comprises a first color and the second indication of the second food type comprises a second color.

11. The kit of claim 10, wherein the second indication of the first food type is configured to be visible when viewed from a side of the first bowl, and wherein the second indication of the second food type is configured to be visible when viewed from a side of the second bowl.

12. The kit of claim 6, wherein the second bowl is sized and configured to nestably couple to an interior portion of the first bowl.

13. The kit of claim 6, wherein the third bowl is sized and configured to nestably couple to an interior portion of the second bowl.

14. The kit of claim 13, further comprising a fourth bowl including a base portion and a wall protruding from and surrounding the base portion of the fourth bowl, the wall of the fourth bowl configured to define an open top portion located opposite the base portion, wherein the fourth bowl defines a fourth volume corresponding to a predetermined macronutrient quantity of carbohydrates for a fourth food type.

15. The kit of claim 14, further comprising:
   an indication of the fourth food type located on the base portion of the fourth bowl, wherein the indication of the fourth food type comprises an indication selected from the group consisting of a visual representation of the fourth food type, a word identifying the fourth food type, and combinations thereof, and a second indication of the fourth food type located on an upper rim of the wall of the fourth bowl, wherein the second indication of the fourth food type comprises a fourth color.

16. The kit of claim 15, wherein the fourth bowl is sized and configured to nestably couple to an interior portion of the third bowl.

17. The kit of claim 16, further comprising a fifth bowl including a base portion and a wall protruding from and surrounding the base portion of the fifth bowl, the wall of the fifth bowl configured to define an open top portion located opposite the base portion, wherein the fifth bowl defines a fifth volume corresponding to a predetermined macronutrient quantity of carbohydrates for a fifth food type.

18. The kit of claim 17, wherein the first food type comprises berries, the second food type comprises popcorn, the third food type comprises chips, the fourth food type comprises crackers, and the fifth food type comprises nuts.

19. The kit of claim 17, further comprising:

an indication of the fifth food type located on the base portion of the fifth bowl, wherein the indication of the fifth food type comprises an indication selected from the group consisting of a visual representation of the fifth food type, a word identifying the fifth food type, and combinations thereof, and a second indication of the fifth food type located on an upper rim of the wall of the fifth bowl, wherein the second indication of the fifth food type comprises a fifth color.

20. The kit of claim 19, wherein the fifth bowl is sized and configured to nestably couple to an interior portion of the fourth bowl.

* * * * *